(12) United States Patent
Kashihara

(10) Patent No.: US 7,215,624 B2
(45) Date of Patent: May 8, 2007

(54) OPTICAL DISK APPARATUS AND OPTICAL DISK RECORDING METHOD

(75) Inventor: Yutaka Kashihara, Chigasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 642 days.

(21) Appl. No.: 10/125,382

(22) Filed: Apr. 19, 2002

(65) Prior Publication Data

US 2003/0021204 A1    Jan. 30, 2003

(30) Foreign Application Priority Data

Apr. 20, 2001  (JP)  ............................. 2001-122885

(51) Int. Cl.
*G11B 20/10*  (2006.01)
(52) U.S. Cl. ................ 369/59.22; 369/59.11; 369/53.35
(58) Field of Classification Search ............ 369/47.51, 369/53.13, 59.22, 59.1, 124.01, 59.12, 59.17, 369/59.16, 124.13, 53.36, 59.11, 53.34, 47.53, 369/53.1, 53.35, 53.27, 116, 53.19, 44.32, 369/44.35, 53.31; 341/58, 59, 68, 69; 360/31, 360/46, 65, 75; 702/85
See application file for complete search history.

(56) References Cited

U.S. PATENT DOCUMENTS

| | | | | |
|---|---|---|---|---|
| 5,450,253 A | * | 9/1995 | Seki et al. ................ | 360/65 |
| 5,642,343 A | * | 6/1997 | Toda et al. ............... | 369/47.53 |
| 5,777,964 A | * | 7/1998 | Furuta et al. ............. | 369/47.53 |
| 5,818,655 A | * | 10/1998 | Satoh et al. ............... | 360/65 |
| 5,970,091 A | * | 10/1999 | Nishida et al. ............ | 702/85 |
| 6,104,685 A | * | 8/2000 | Saga et al. ............... | 369/59.11 |
| 6,148,043 A | | 11/2000 | Fujimoto ................ | 375/341 |
| 6,157,609 A | * | 12/2000 | Shoji et al. .............. | 369/275.3 |
| 6,476,992 B1 | * | 11/2002 | Shimatani ............... | 360/46 |
| 6,480,449 B1 | * | 11/2002 | Narumi et al. .......... | 369/47.53 |
| 6,492,915 B2 | * | 12/2002 | Maeda et al. ............ | 341/58 |
| 6,597,650 B2 | * | 7/2003 | Katakura et al. ........ | 369/59.22 |
| 6,791,926 B1 | * | 9/2004 | Furumiya et al. ....... | 369/53.13 |

FOREIGN PATENT DOCUMENTS

| | | |
|---|---|---|
| JP | 2000-90436 | 3/2000 |
| JP | 2001-14804 | 1/2001 |

* cited by examiner

*Primary Examiner*—Tan Dinh
*Assistant Examiner*—Kim-Kwok Chu
(74) *Attorney, Agent, or Firm*—Oblon, Spivak, McClelland, Maier & Neustadt, P.C.

(57) ABSTRACT

An optical disk apparatus includes a detector for detecting a data string corresponding to a waveform pattern having a predetermined time width, an ideal signal generator for generating a data string of an ideal signal having a predetermined time width, which corresponds to a data string having the predetermined time width, a parameter calculator for comparing the detected data string with the data string of the generated ideal signal, and determining a waveform compensation amount on the basis of the comparison result, a recording waveform generator for generating a recording waveform pulse on the basis of externally supplied recording data and the waveform compensation amount, and a pickup for irradiating a storage area of the optical disk with a laser beam in accordance with the recording waveform pulse to record the recording data.

7 Claims, 19 Drawing Sheets

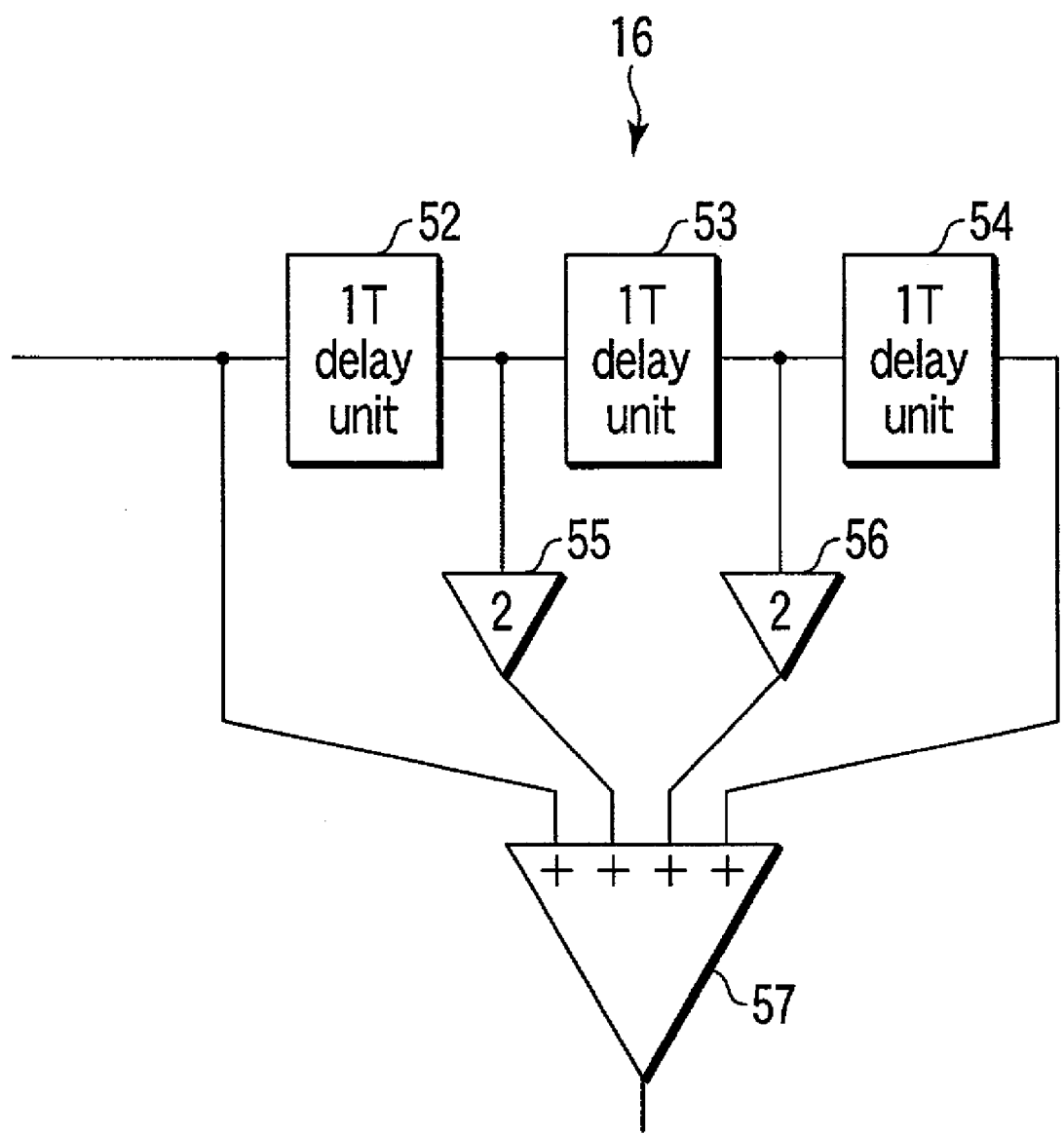
F I G. 3

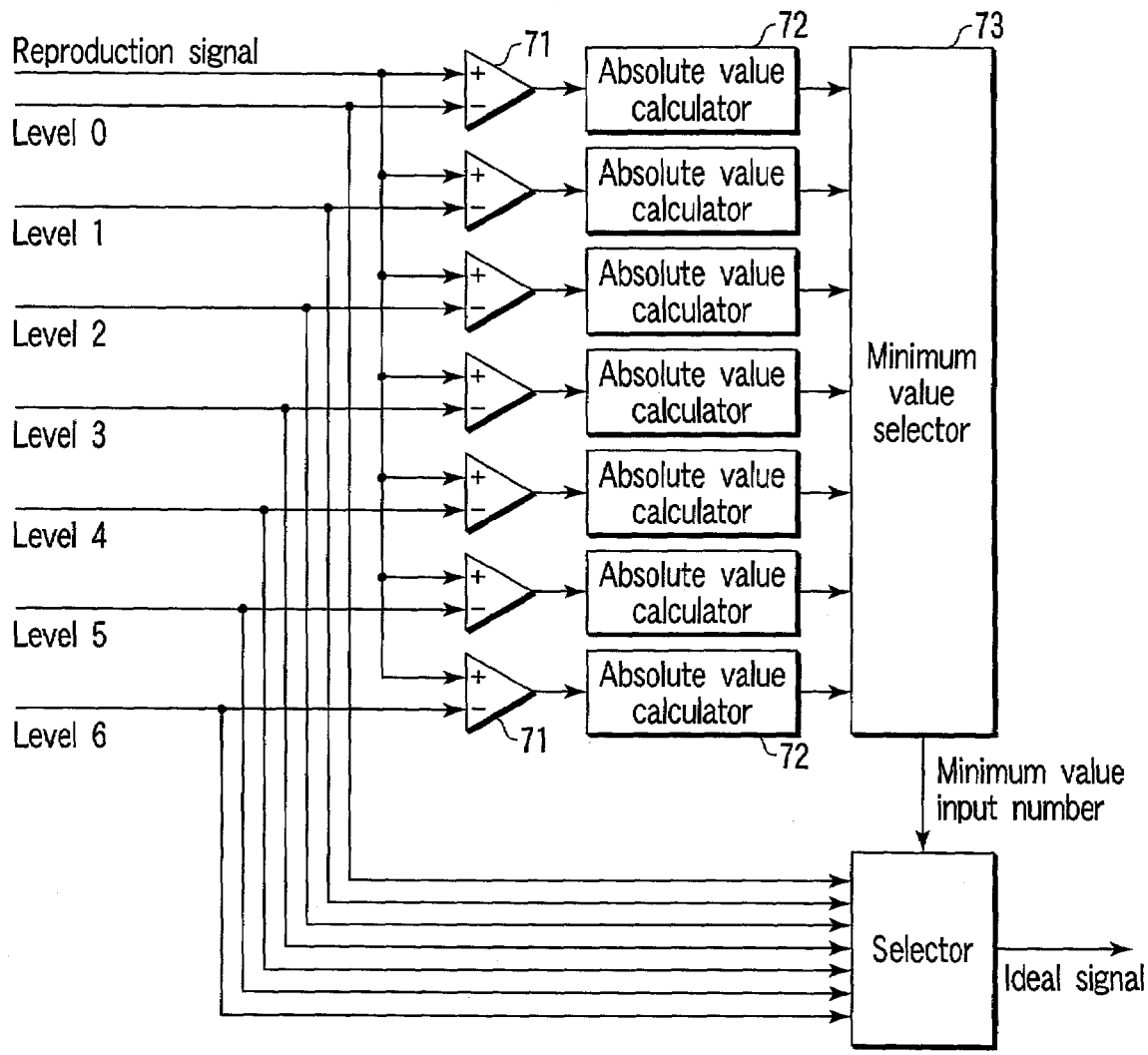
F I G. 13

Ideal signal I

Error signal E

L (m, n) memory

T (m, n) memory

OPTICAL DISK APPARATUS AND OPTICAL DISK RECORDING METHOD

CROSS-REFERENCE TO RELATED APPLICATIONS

This application is based upon and claims the benefit of priority from the prior Japanese Patent Application No. 2001-122885, filed Apr. 20, 2001, the entire contents of which are incorporated herein by reference.

BACKGROUND OF THE INVENTION

1. Field of the Invention

The present invention relates to an optical disk apparatus and, more particularly, to an optical disk apparatus which, in a recording process, calculates a recording waveform compensation amount and compensates a recording waveform pulse in accordance with the calculated amount.

2. Description of the Related Art

Recently, optical disk apparatuses for performing recording and reproduction with respect to optical disks such as a DVD (Digital Versatile Disc) have been widely used and are developed and manufactured by various specifications. Under the circumstances, it is being desired to improve the performance of the recording waveform pulse compensation technology which changes recording characteristics in accordance with the characteristics of each individual optical disk.

A conventional optical disk system, irrelevant to the present invention, which performs recording waveform pulse compensating process generally comprises a motor for rotating an optical disk at a predetermined rotating speed, a pickup for emitting and receiving a laser beam, a recording means reproducing means, a parameter calculating means, and a recording waveform pulse position/width control means. In this optical disk system, information recorded on an optical disk is reproduced as a weak analog signal by using a pickup head. This analog signal is amplified to a sufficient signal level by a preamplifier and converted into a binary signal corresponding to a mark/space by a level slicer. A PLL (Phase Lock Loop) circuit generates a channel clock whose phase is synchronized with the input binary signal.

By using these binary signal and channel clock signal, a waveform compensation amount before the mark is obtained. On the basis of this compensation amount, the recording waveform pulse position/width control means generates a recording waveform pulse having a recording waveform which does not cause any heat interference at the corresponding space length, thereby recording predetermined data with appropriate characteristics.

Unfortunately, this conventional optical disk apparatus includes a waveform correction amount calculator (parameter calculator) which uses a level slicing method as an identification method. Therefore, if a digital method such as a PRML (Partial Response and Maximum Likelihood) method is used as an identification method, the above conventional method cannot calculate a waveform correction amount.

The PRML method is described in U.S. Pat. No. 6,148,043. However, this reference does not disclose any practical method by which the PRML method is applied to an optical disk recording process. That is, the reference cannot realize an optical disk recording/reproducing process using the PRML method.

BRIEF SUMMARY OF THE INVENTION

It is an object of the present invention to provide an optical disk apparatus including a waveform compensating function for performing appropriate waveform correction even when a digital method, e.g., the PRML method, is used as an identification method.

The present invention is an optical disk apparatus for recording data on an optical disk having a concentric or spiral storage area, comprising rotating means for rotating the optical disk at a predetermined rotating speed, reproduction signal generating means for irradiating the optical disk rotated by the rotating means with a laser beam, and generating a reproduction signal containing a data string having a predetermined time width corresponding to the waveform pattern of the reflected wave of the laser beam, ideal signal generating means for generating an ideal signal containing a data string having the predetermined time width, which corresponds to the data string having the predetermined time width contained in the reproduction signal generated by the reproduction signal generating means, waveform compensation amount determining means for comparing the data string having the predetermined time width contained in the reproduction signal generated by the reproduction signal generating means with the data string having the predetermined time width contained in the ideal signal generated by the ideal signal generating means, and determining a waveform compensation amount on the basis of the comparison result, recording waveform generating means for performing predetermined processing for externally supplied recording data, and generating a recording waveform pulse on the basis of the waveform compensation amount determined by the waveform compensation amount determining means, and recording means for generating a laser beam in accordance with the recording waveform pulse generated by the recording waveform generating means, and irradiating a storage area of the optical disk with this laser beam to record the recording data.

As described above, the present invention generates a data string having a predetermined time width corresponding to the waveform pattern of a reproduction signal detected from an optical disk, and also generates an ideal signal containing a data string having a predetermined time width corresponding to the waveform pattern. An error amount E is obtained by comparing the data string of the reproduction signal with the data string of the ideal signal. On the basis of this error amount E, a waveform compensation amount C is determined. The recording waveform of given recording data R is compensated by this waveform compensation amount C. After that, the recording data R is recorded on the optical disk. In this way, the detection signal and the ideal signal are compared not by values at one certain timing but by data strings which are a plurality of sample data having a predetermined time width. This allows an accurate detection of the error amount of each unique waveform pattern by a statistical method. Consequently, it is possible to properly perform a recording process using an appropriate waveform compensation amount obtained by a digital identification method.

In the above-mentioned prior art, on the other hand, a waveform compensation amount is calculated from the phase difference between the leading or trailing edge of the binary signal and the channel clock. This system is effective in a method which uses a slicing method as an identification method. However, the system cannot be applied to a method, such as an integral detection method, which performs identification from the amplitude of a reproduction signal sample. Especially when the recording density of an optical disk system increases, the use of a slicing method as an identification method is unsatisfactory, so a high-level identification method such as a PRML (Partial Response and Maximum Likelihood) method is necessary. Unfortunately, this PRML method also performs identification from the amplitude of a reproduction signal sample. Accordingly, no appropriate waveform compensation amount can be obtained by the prior art.

BRIEF DESCRIPTION OF THE SEVERAL VIEWS OF THE DRAWING

FIG. 3 is a block diagram showing the arrangement of an example of an ideal signal generator of the optical disk apparatus shown in FIG. 1;

FIG. 13 is a block diagram showing the arrangement of an example of a reference level selector shown in FIG. 12;

DETAILED DESCRIPTION OF THE INVENTION

Embodiments of the present invention will be described in detail below with reference to the accompanying drawing.

<Optical Disk Apparatus According to First Embodiment>

Figure 1:
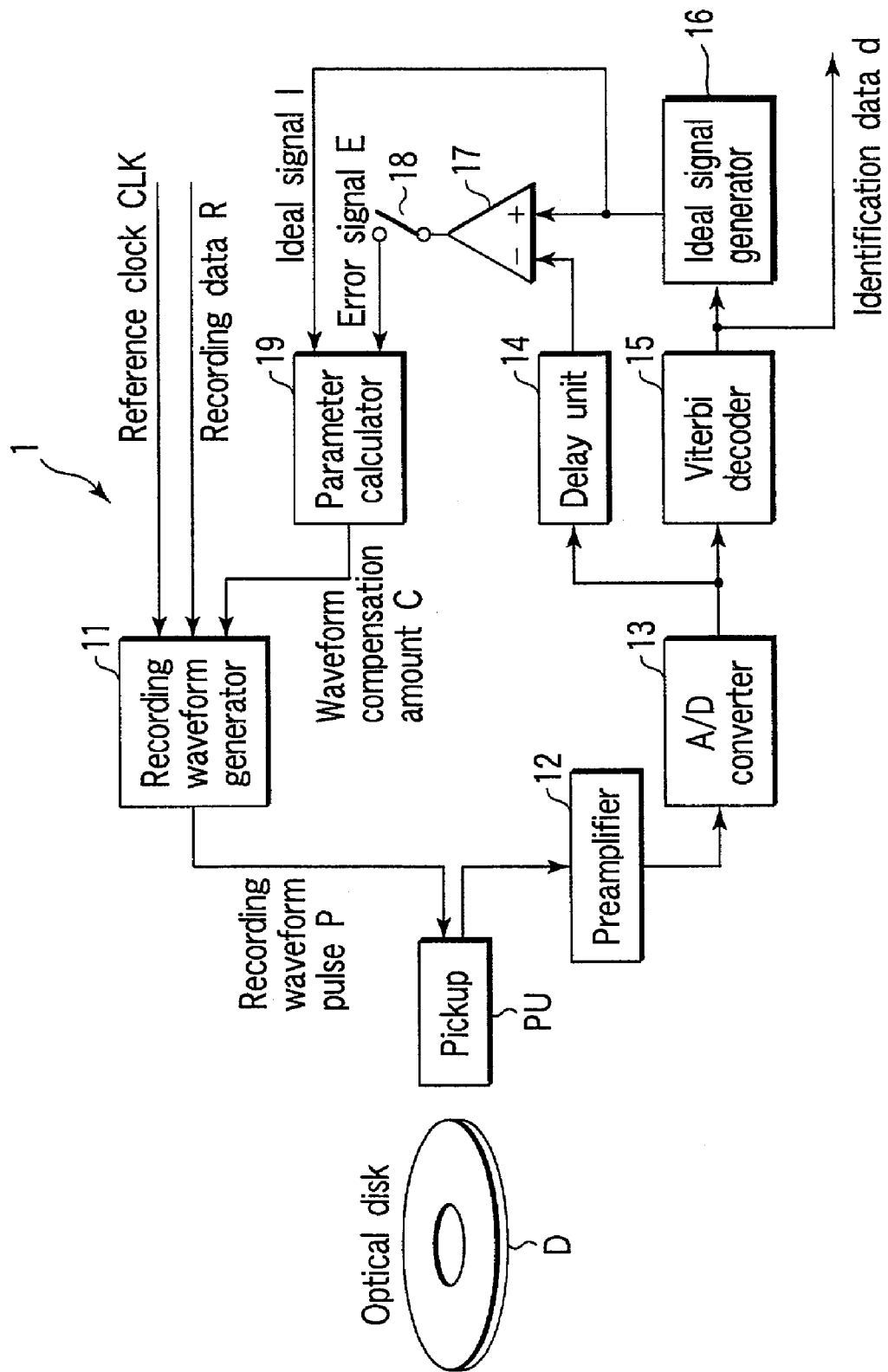
FIG. 1 is a block diagram showing the main component of the first embodiment as an example of an optical disk apparatus according to the present invention.
Figure 2:
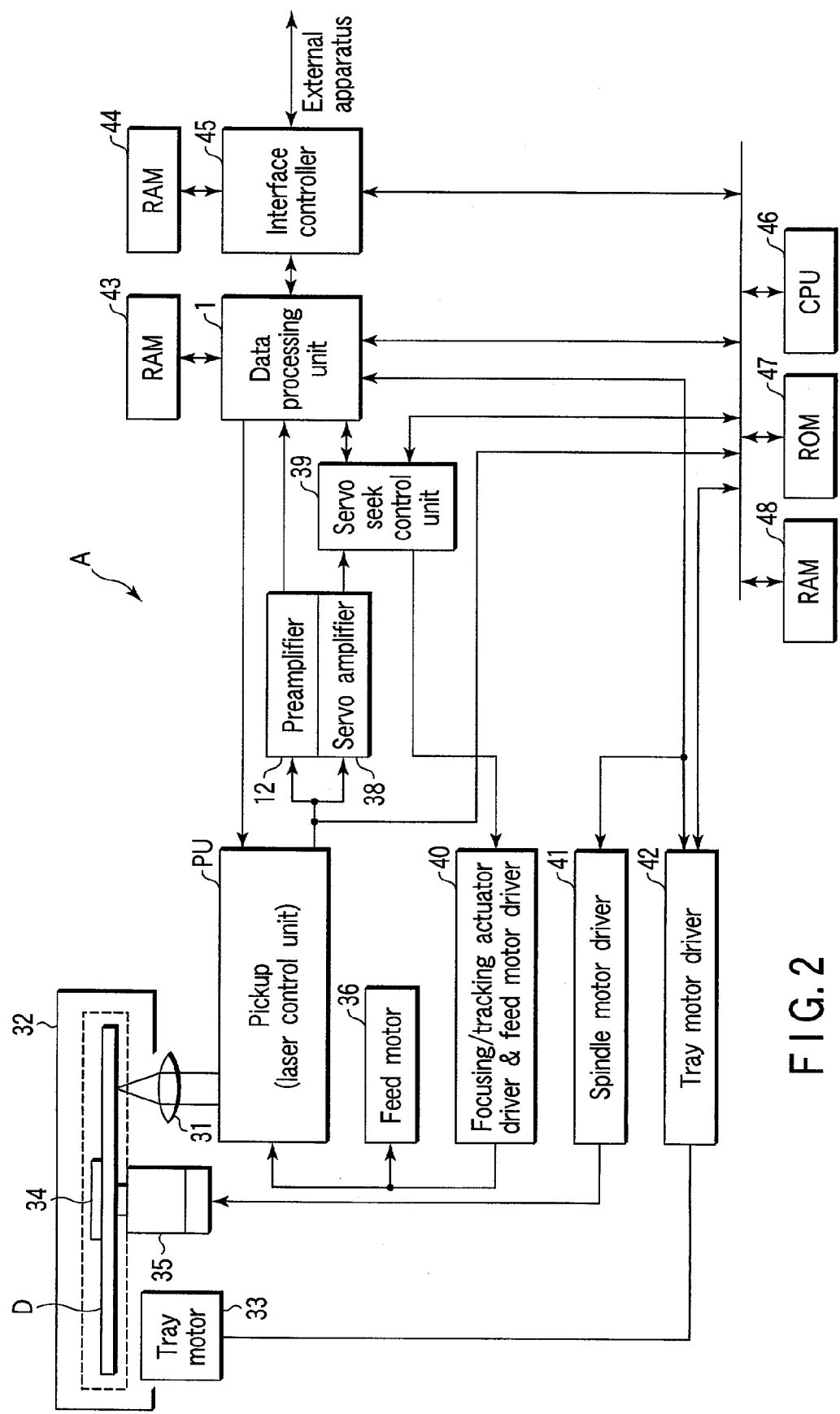
FIG. 2 is a block diagram showing the whole configuration of the optical disk apparatus according to the present invention.

FIG. 1 is a block diagram showing the major component of the first embodiment as an example of an optical disk apparatus according to the present invention. FIG. 2 is a block diagram showing the whole configuration of this optical disk apparatus according to the present invention.

FIG. 1 shows a data processing unit 1 as the main component of the present invention. FIG. 2 shows the overall arrangement of the optical disk apparatus including this data processing unit 1.

(Basic Configuration of Optical Disk Apparatus)

Referring to FIG. 2, an optical disk apparatus A according to the present invention performs records and reproduces data with respect to an optical disk D. This optical disk apparatus A includes a tray 32 for transporting the optical disk D contained in a disk cartridge, a motor 33 for driving this tray 32, a clamper 34 for clamping the optical disk D, and a spindle motor 35 for rotating the optical disk D, clamped by the damper 34, at a predetermined rotating speed. In addition, a CPU 46, a ROM 47, and a RAM 48 are connected via a control bus. The CPU 46 controls the overall operation as a controller. The ROM 47 stores a basic program of this control operation and the like. The RAM 48 stores individual control programs and application data such that these programs and data can be rewritten. The optical disk apparatus A further includes a motor 36 for transporting a pickup PU, a focusing/tracking actuator driver & feed motor driver 40 for controlling focusing and tracking of the pickup, a spindle motor driver 41 for driving the spindle motor 35, and a tray motor driver 42 for driving the tray motor, each of which is connected to the controller such as the CPU 46.

Also, the optical disk apparatus A comprises a preamplifier 12 connected to the pickup PU to amplify a detection signal, a servo amplifier 38, and a servo seek control unit 39 for supplying to drivers a seek signal for performing a seek operation. The data processing unit 1 described above is connected to, e.g., the pickup PU, the preamplifier 12, and the servo seek control unit 39 to process detection signals and recording signals. A RAM 43 stores data to be used in these various processes. An interface controller 45 exchanges signals from the data processing unit 1 with an external apparatus in collaboration with a RAM 44.

In this optical disk apparatus, the data processing unit 1 of the present invention is configured as shown in FIG. 1 to enable an appropriate waveform compensating function even when a digital method is used as an identification method. That is, this data processing unit 1 includes an A/D converter 13 for receiving a signal from the preamplifier 12, a delay unit 14 connected to this A/D converter 13, and a Viterbi decoder 15 using a PRML (Partial Response and Maximum Likelihood) method. The data processing unit 1 further includes an ideal signal generator 16 and a subtracter 17. The ideal signal generator 16 is the characteristic feature of the present invention and receives an output from the Viterbi decoder 15. The subtracter 17 receives outputs from the delay unit 14 and the ideal signal generator 16. In addition, a parameter calculator 19 receives an error signal E as an output from the subtracter 17 and an ideal signal I from the ideal signal generator 16 to calculate a parameter, and outputs a waveform compensation amount C corresponding to the calculated parameter. A recording waveform generator 11 receives this waveform compensation amount C to generate a recording waveform, and supplies a recording waveform pulse P to the pickup PU.

(Operation of Optical Disk Apparatus)

The optical disk apparatus with the above configuration according to the present invention records and reproduces data with respect to an optical disk as follows. That is, when the optical disk D is loaded into the optical disk apparatus A, control information of this optical disk D, which is recorded in a control data zone in an emboss data zone of a read-in area of the optical disk D, is read by the pickup PU and the data processing unit 1 and supplied to the CPU 46.

In the optical disk apparatus A of the present invention, on the basis of, e.g., operation information pertaining to an operation by a user, the control information of the optical disk D recorded in the control data zone of the optical disk D, and the present status, a laser beam is generated by biasing by a laser control unit (not shown) under the control of the CPU 46.

The generated laser beam is converged by an objective lens 31 to irradiate a recording region of the disk. Consequently, data is recorded in the storage region of the optical disk D (mark string generation: data is recorded on the optical disk D in accordance with intervals between variable-length marks and with the length of each variable-length mark). Alternatively, a reflecting wave corresponding to stored data is reflected and detected to reproduce the data.

In FIG. 2, the laser control unit included in the pickup PU is set by the data processing unit 1. This setting changes in accordance with a reproducing power for obtaining a reproduction signal S, a recording power for recording data, and an erasing power for erasing data. The laser beam has powers at different levels corresponding to these three powers, i.e., the reproducing power, recording power, and erasing power. A semiconductor laser unit is biased by the laser control unit so as to generate a laser beam having a required one of the three powers.

This laser control unit is composed of a resistor and transistor (neither is shown). A power supply voltage is applied to the resistor, the transistor, and a semiconductor laser as the semiconductor laser unit. Since the amplification factor changes in accordance with the base current of the transistor, different electric currents flow through a semiconductor laser oscillator, so laser beams having different intensities are generated. In this embodiment, as the characteristic feature of the present invention as will be described in detail later, recording waveform compensation is performed in accordance with the characteristics of each individual optical disk, and a laser power is generated in accordance with an output recording waveform pulse P from the recording waveform generator 11, thereby recording data on the optical disk.

In order for the optical disk D to face the objective lens 31, this optical disk D is loaded into the apparatus by the tray 32 directly or in the form of a disk cartridge. The tray motor 33 for driving the tray 32 is contained in the apparatus. The optical disk D thus loaded is rotatably clamped on the spindle motor 35 by the clamper 34, and rotated at a predetermined rotating speed by the spindle motor 35.

The pickup PU contains a photodetector (not shown) for detecting a laser beam. This photodetector detects a laser beam reflected by the optical disk D and returned through the objective lens 31. A detection signal (electric current signal) from the photodetector is converted into a voltage signal by a current/voltage converter (I/V), and this voltage signal is supplied to the preamplifier 12 and the servo amplifier 34. The preamplifier 12 outputs to the data processing unit 1 a signal for reproducing header data and a signal for reproducing data in a recording area. The servo amplifier 34 outputs servo signals (a tracking error signal and focusing error signal) to the servo seek control unit 39.

Examples of a method of optically detecting a focusing error are an astigmatism method and knife edge method described below.

In the astigmatism method, an optical element (not shown) for generating astigmatism is inserted in the detection optical path of a laser beam reflected by a light reflecting layer or light reflective recording layer of the optical disk D, and a change in the shape of a laser beam reflected onto the photodetector is detected. The light detection region is diagonally divided into four portions. From detection signals obtained from these detection regions, the servo seek control unit 39 calculates the differences between diagonal sums and obtains a focusing error detection signal (focusing signal).

The knife edge method uses a knife edge which asymmetrically shields portions of a laser beam reflected by the optical disk D. The light detection region is divided into two portions. A focusing error detection signal is obtained by calculating the difference between detection signals obtained from the two detection regions.

Normally, one of the astigmatism method and knife edge method described above is used.

The optical disk D has a spiral or concentric track, and information is recorded on this track. By tracing a focused spot along this track, information is reproduced, recorded, or erased. To stably trace the focused spot along the track, a relative positional difference between the track and the focused spot must be optically detected.

General examples of a tracking error detection method are a differential phase detection method, push-pull method, and twin-spot method described below.

The differential phase detection method detects, on the photodetector, a change in the intensity distribution of a laser beam reflected by the light reflecting layer or light reflective recording layer of the optical disk D. The light detection region is diagonally divided into four portions. From detection signals obtained from these detection regions, the servo seek control unit 39 calculates the differences between diagonal sums and obtains a focusing error detection signal (focusing signal).

The push-pull method detects, on the photodetector, a change in the intensity distribution of a laser beam reflected by the optical disk D. The light detection region is divided into two portions. A focusing error detection signal is obtained by calculating the difference between detection signals obtained from the two detection regions.

In the twin-spot method, a diffracting element or the like is placed in a light feeding system between a semiconductor laser element and the optical disk D to divide light into a plurality of wave surfaces, and a change in the reflected light amount of ±primary diffracted light irradiating the optical disk D is detected. In addition to a light detection region for detecting a reproduction signal, light detection regions for separately detecting the reflected light amount of +primary diffracted light and that of −primary diffracted light are formed. A tracking error detection signal is obtained by calculating the difference between detection signals from these detection regions.

By the focusing control and tracking control as described above, the servo seek control unit 39 supplies a focusing signal, tracking signal, and feed signal to the focusing/ tracking actuator driver & feed motor driver 40. This driver 40 performs focusing servo control and tracking servo control for the objective lens 31. In addition, the driver 40 supplies a biasing signal to the feed motor 36 in accordance with an access signal, controlling the transportation of the pickup PU.

The servo seek control unit 39 is controlled by the data processing unit 1. For example, the data processing unit 1 supplies an access signal to the servo seek control unit 39 to generate a feed signal.

Also, control signals from the data processing unit 1 control the spindle motor driver 41 and the tray motor driver 42 to bias the spindle motor 35 and the tray motor 33, respectively. Accordingly, the spindle motor 35 is rotated at a predetermined rotating speed, and the tray motor 33 properly controls the tray.

The reproduction signal S corresponding to the data in the header portion, which is supplied to the data processing unit 1, is supplied to the CPU 46. From this reproduction signal S, the CPU 46 determines a sector number as the address of the header portion and compares this sector number with a sector number as an address to be accessed (i.e., to which data is to be recorded or from which recorded data is to be reproduced).

From the reproduction signal S corresponding to the data in the storage area and supplied to the data processing unit 1, necessary data is stored in the RAM 48. The reproduction signal S is processed by the data processing unit 1 and supplied to the interface controller 45. A reproducing process signal is supplied to an external apparatus such as a personal computer.

<Recording Pulse Compensation Unique to Present Invention>

Recording pulse compensation performed by the data processing unit 1 unique to the present invention will be described in detail below with reference to the accompanying drawing. Referring to FIG. 1, information recorded as marks and spaces on the optical disk D is read out as a weak analog signal by the pickup PU. This weak analog signal is amplified to a sufficient level by the preamplifier 12. The amplified analog reproduction signal is converted into a digital reproduction signal S by the A/D converter 13. This digital reproduction signal S is divided into two signals: one is supplied to the Viterbi decoder 15, and the other is supplied to the delay unit 14. The Viterbi decoder 15 decodes the signal into binary identification data d in accordance with the Viterbi algorithm. This identification data d is supplied to a subsequent circuit (not shown) and, if necessary, subjected to processing such as demodulation and error correction. After that, the data is transferred to a user via the interface controller 45. The identification data d is also supplied to the ideal signal generator 16.

This ideal signal generator 16 generates an ideal reproduction signal (to be referred to as an ideal signal I) corresponding to the PR characteristic to be used. The delay unit 14 delays the reproduction signal S by a predetermined time so that this reproduction signal S is in phase with the ideal signal I. The reproduction signal S and the ideal signal I in phase with each other are supplied to the subtracter 17. This subtracter 17 subtracts the reproduction signal S from the ideal signal I to calculate an error signal E. This error signal E and the ideal signal I are supplied to the parameter calculator 19. The parameter calculator 19 stores the error signal E into a memory area corresponding to the detected waveform pattern and calculates a waveform compensation amount C of the recording waveform in accordance with the result of storage.

On the basis of a reference clock CLK, recording data R, and the waveform compensation amount C, the recording waveform generator 11 generates a recording waveform pulse P. The pickup PU uses this generated recording waveform pulse P to record information on the optical disk D.

A "sequence" is, e.g., the waveform pattern, which is given in units of, e.g., 8 bits in the form of digital data, of the reproduction signal S. Since the sequence is given in the form of digital data, the number of types of its patterns is finite. Therefore, statistical processing for error amounts of these patterns can be performed within time periods much shorter than when analog signals are processed. Also, an error signal E is obtained by comparing a plurality of sample signals (data strings having a predetermined time width) of each waveform pattern (sequence) of the reproduction signal S with those of the ideal signal I. Unlike a conventional comparison process of calculating an error amount by comparing one value of an analog signal with that of an ideal signal, the above comparison process can obtain a more accurate error amount for the whole change in a signal of each waveform pattern (sequence). Accordingly, it is possible to perform very appropriate recording pulse compensation corresponding to the measurement results of each individual disk.

The operation of each unit will be explained in more detail below.

(Ideal Signal Generator)

Figure 4:
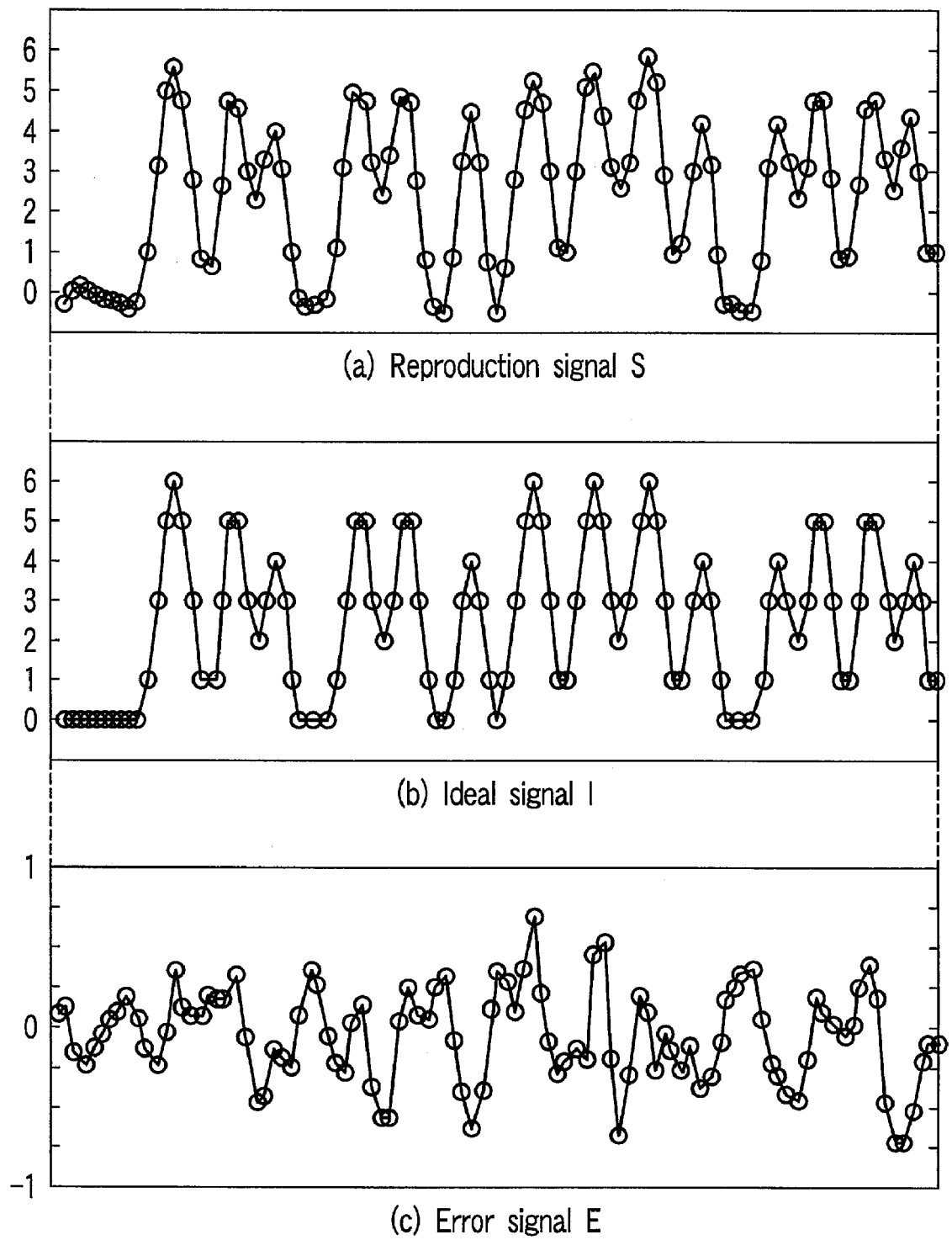
FIG. 4 is a graph showing the relationship between the reproduction signal, ideal signal, and error signal in the optical disk apparatus according to the present invention.
Figure 5:
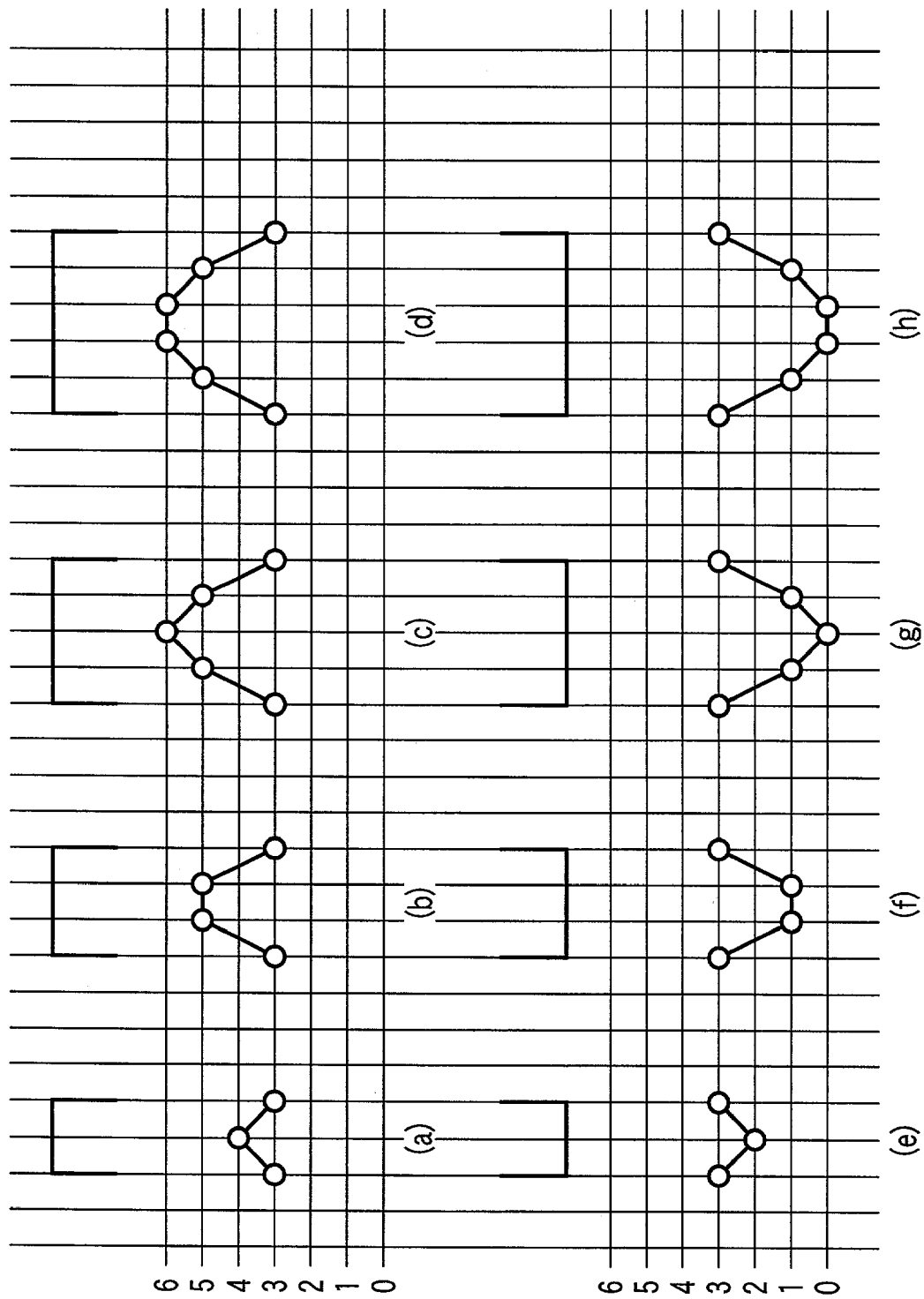
FIG. 5 is a graph showing the relationships between nT marks, spaces, and ideal signals in the optical disk apparatus according to the present invention.

Details of the ideal signal generator will be described below with reference to the accompanying drawing. FIG. 3 is a block diagram showing the arrangement of an example of the ideal signal generator. FIG. 4 is a graph showing the relationship between the reproduction signal, ideal signal, and error signal. FIG. 5 is a graph showing the relationships between nT marks, spaces, and ideal signals.

FIG. 3 shows an example of the arrangement of the ideal signal generator 16 when a PR(1,2,2,1) characteristic is used. This example of the ideal signal generator comprises a first delay unit 52 for receiving an input signal, a second delay unit 53 for receiving an output from the first delay unit 52, a third delay unit 54 for receiving an output from the second delay unit 53, a subtracter 55 for receiving the output from the first delay unit 52, a subtracter 56 for receiving the output from the second delay unit 53, and a comparator 57 for receiving outputs from these subtracters 55 and 56, the input signal, and an output from the third delay unit 54. This ideal signal generator 16 is a so-called 4-tap FIR (Finite Impulse Response) filter, and its tap coefficient is "1,2,2,1". For example, when a waveform pattern (sequence) "00010000" is input to the ideal signal generator 16, "00012210" is output. Likewise, when "000110000" is input, "000134310" is output; when "0001110000" is input, "000135531" is output; and when "00011110000" is input, "00013565310" is output.

When a waveform pattern (sequence) is expressed by the PR(1,2,2,1) characteristic, it is one of seven levels "0, 1, 2, 3, 4, 5, and 6". For the sake of convenience, a waveform pattern (sequence) in which n code bits "1" continue will be defined as an nT mark, and a waveform pattern (sequence) in which n code bits "0" continue will be defined as an nT space. When an RLL(1,7) code (RLL: Run Length Limited) is used as a modulation code as described above, waveform patterns (sequences) appearing in recording data are limited to 2T to 8T marks and 2T to 8T spaces. Accordingly, an error amount can be statistically processed within a short time period for each waveform pattern (sequence). Also, one waveform pattern (sequence) can be expressed as a plurality of sample data strings in accordance with the type of the waveform pattern (sequence). That is, as for a 4T mark, for example, subtraction is performed between an ideal signal and a reproduction (detection) signal for three samples of an error signal E in portions of levels 5 and 6, thereby cumulatively adding the three samples of the error signal E and storing the result into a 4T_M memory. In this manner, an appropriate compensation amount of a whole waveform including signal changes before and after the waveform can be obtained, unlike in a compensation process by a conventional apparatus by which comparison with an ideal signal is performed for one sample.

FIG. 4 illustrates the relationship between the reproduction signal S, the ideal signal I, and the error signal E in the optical disk system in which the RLL(1,7) code and the PR(1,2,2,1) characteristic are combined. The reproduction signal S (a) and the ideal signal I (b) do not completely match owing to degradation factors such as inferior mark formation, which is caused by a difference from an optimum value of the recording waveform pulse, and noise. The result of subtraction of the reproduction signal S (detection signal) from the ideal signal I is obtained as the error signal E (c).

FIG. 5 shows an example of the form which this waveform pattern (sequence) can take. In the RLL(1,7) code, waveform patterns (sequences) appearing in recording data are limited to 2T to 8T marks and 2T to 8T spaces, so the ideal signal I is also limited to finite patterns. That is, if level 3 is the start and end points as shown in FIG. 5, a 2T mark of (a) corresponds to (3,4,3), a 3T mark of (b) corresponds to (3,5,5,3), a 4T mark of (c) corresponds to (3,5,6,5,3), and a 5T mark of (d) corresponds to (3,5,6,6,5,3). Also, a 2T space of (e) corresponds to (3,2,3), a 3T space of (f) corresponds to (3,1,1,3), a 4T space of (g) corresponds to (3,1,0,1,3), and a 5T space of (h) corresponds to (3,1,0,0,1,3).

(Parameter Calculator)

Figure 6:
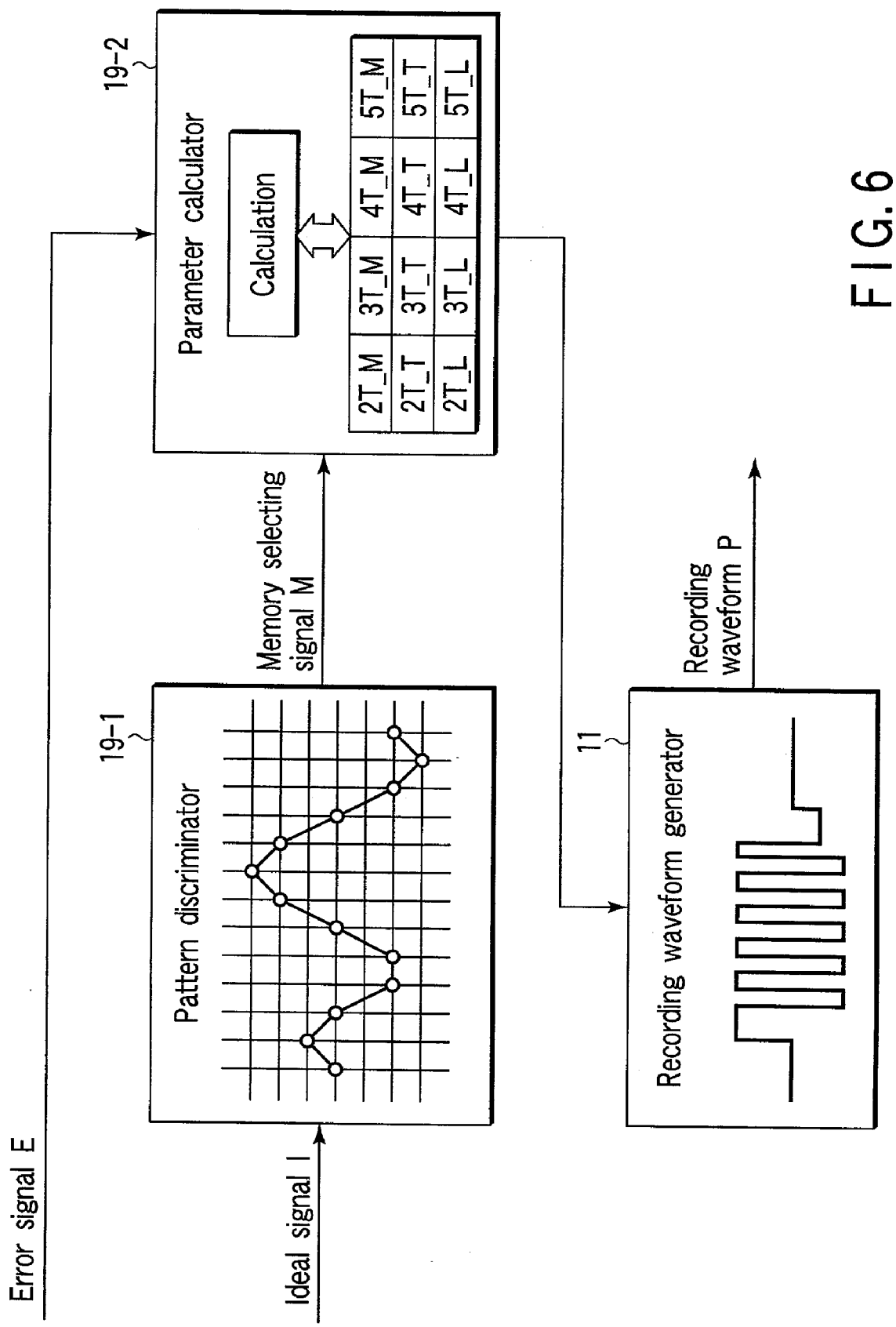
FIG. 6 is a block diagram showing the relationship between a parameter calculator and a recording waveform generator of the first embodiment.
Figure 7:
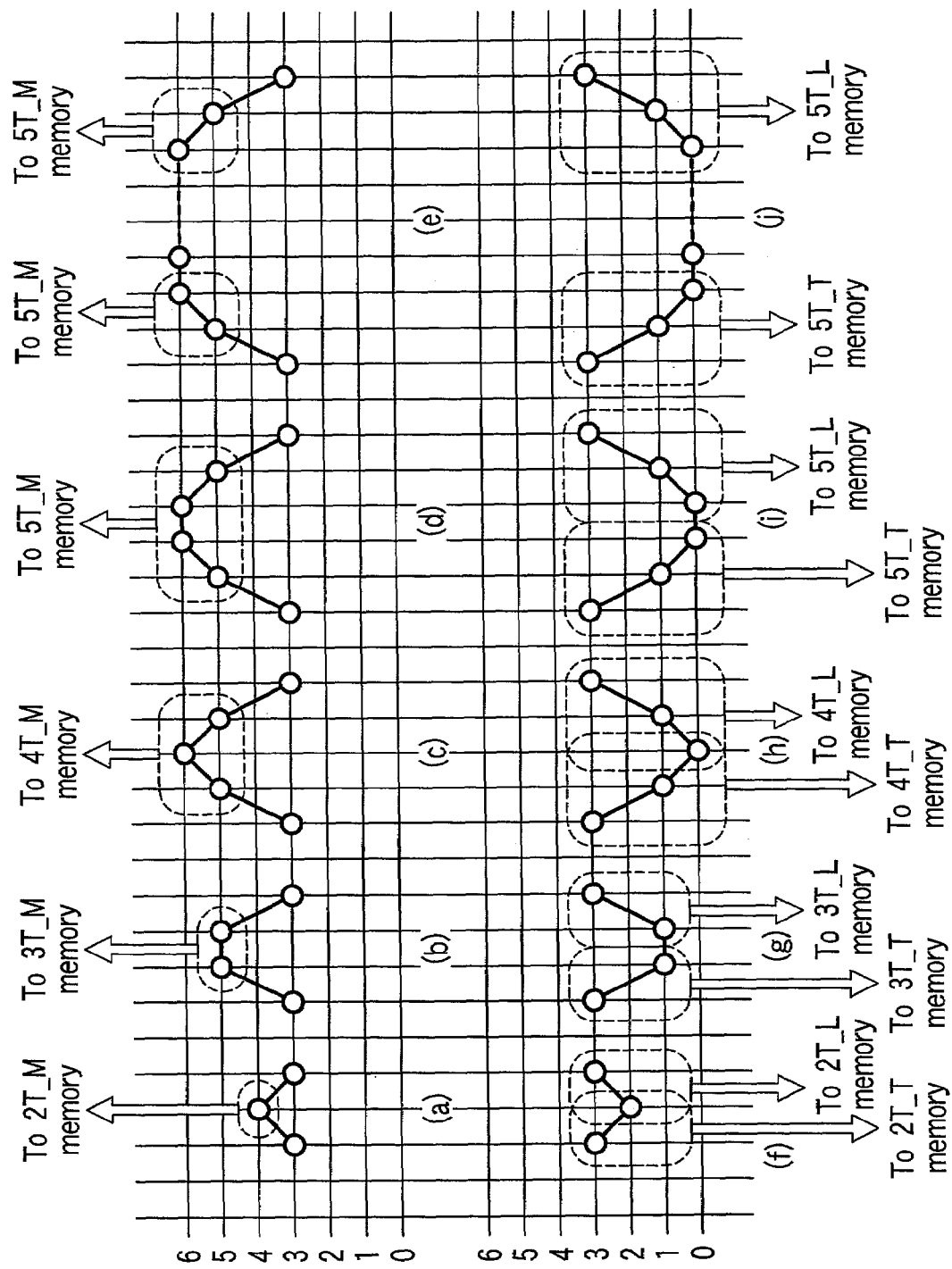
FIG. 7 is a graph showing the relationships between the data patterns and error signal cumulative addition memory positions in the first embodiment.
Figure 8:
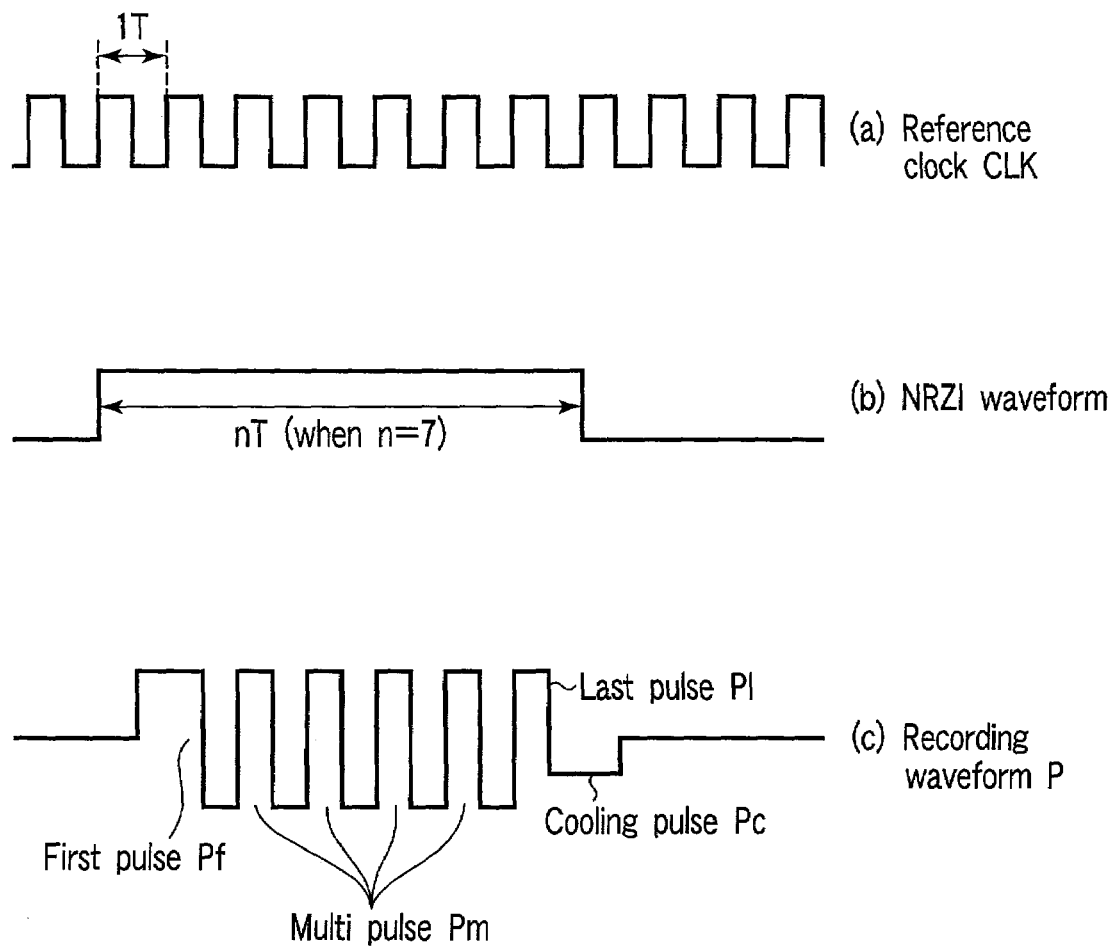
FIG. 8 is a timing chart showing recording waveform pulses in the first embodiment.
Figure 9:
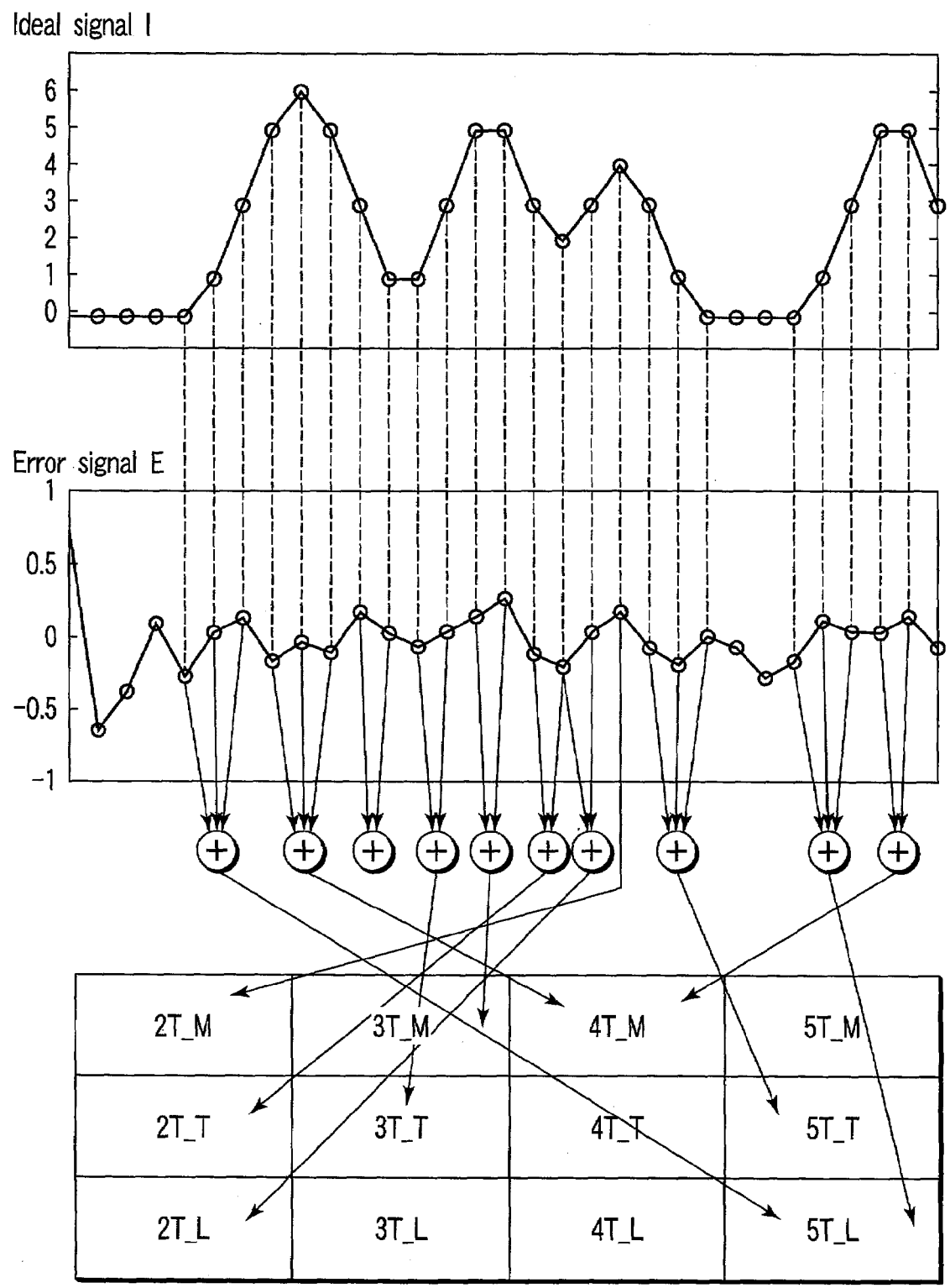
FIG. 9 is a view showing an example of the processing by a parameter calculator of the first embodiment.

The operation of the parameter calculator will be described in detail below with reference to the accompanying drawing. FIG. 6 is a block diagram showing the relationship between the parameter calculator and the recording waveform generator of the first embodiment. FIG. 7 is a graph showing the relationships between data patterns and error signal cumulative addition memory positions. FIG. 8 is a timing chart showing recording waveform pulses. FIG. 9 is a view for explaining an example of a method of determining a compensation amount.

A pattern discriminator 19-1 shown in FIG. 6 can discriminate the reproduction signal S as several patterns shown in FIG. 7 on the basis of the ideal signal I described above. In accordance with a memory selecting signal M corresponding to this discrimination result, as shown in FIG. 7, for a 2T mark of (a), a parameter calculator 19-2 cumulatively adds one sample of the error signal E at level 4 to a 2T_M memory. For a 3T mark of (b), two samples of the error signal E at level 5 are cumulatively added to a 3T_M memory. For a 4T mark of (c), three samples of the error signal E at levels 5 and 6 are cumulatively added to a 4T_M memory. For a 5T mark of (d), four samples of the error signal E at levels 5 and 6 are cumulatively added to a 5T_M memory. For a 6T mark of (e) or higher, four samples of the error signal E at levels 5 and 6 appearing first and at levels 5 and 6 appearing last are cumulatively added to the 5T_M memory.

Next, for a 2T space of (f), two samples of the error signal E at level 3 appearing first and at level 2 are cumulatively added to a 2T_T memory, and two samples of the error signal E at level 2 and at level 3 appearing last are cumulatively added to a 2T_L memory. For a 3T space of (g), two samples of the error signal E at levels 3 and 1 appearing first are cumulatively added to a 3T_T memory, and two samples of the error signal E at levels 1 and 3 appearing last are cumulatively added to a 3T_L memory. For a 4T space of (h), three samples of the error signal E at levels 3 and 1 appearing first and at level 0 are cumulatively added to a 4T_T memory, and three samples of the error signal E at level 0 and at levels 1 and 3 appearing last are cumulatively added to a 4T_L memory. For a 5T space of (i), three samples of the error signal E at levels 3, 1, and 0 appearing first are cumulatively added to a 5T_T memory, and three samples of the error signal E at levels 0, 1, and 3 appearing last are cumulatively added to a 5T_L memory. For a 6T space of (j) or higher, three samples of the error signal E at levels 3, 1, and 0 appearing first are cumulatively added to the 5T_T memory, and three samples of the error signal E at levels 0, 1, and 3 appearing last are cumulatively added to the 5T_L memory.

Also, in the 2T_M to 5T_M, 2T_T to 5T_T, and 2T_L to 5T_L memories, moduli are counted in addition to the cumulative sums of the error signal E. When a predetermined period has elapsed, the cumulative sums stored in the 2T_M to 5T_M, 2T_T to 5T_T, and 2T_L to 5T_L memories are divided by the moduli. A waveform compensation value C is calculated from the quotients.

FIG. 8 illustrates a 7T mark of a recording waveform pulse. This 7T mark is recorded by a first pulse, four multi pulses, and a last pulse. Depending on an optical disk medium, however, a cooling pulse is output after the last pulse. A 2T mark is recorded only by a first pulse. A 3T mark is recorded by first and last pulses. An nT (n≧4) mark is recorded by a first pulse, (n−3) multi pulses, and a last pulse.

FIG. 9 is a view for explaining in detail the series of operations of the parameter calculator described above. That is, as shown in FIG. 9, a reproduction signal pattern is discriminated first on the basis of a given reproduction signal S, thereby generating an ideal signal I. Next, an error signal E which is the difference between the thus generated ideal signal I and the reproduction signal S is calculated. In accordance with the types of waveform patterns (sequences) of the reproduction signal S and the ideal signal, if the first one is 5T_L, an error amount corresponding to the error signal E is accumulated in the 5T_L memory. If the next ones are 4T_M, 3T_T, . . . , error amounts are accumulated in the 4T_M memory, the 3T_T memory, . . . , and so on, in accordance with the types of signals.

In this manner, data of error amounts are accumulated in accordance with the detected error signal E. It should be noted that for 5T_L, for example, not one sample signal but three sample signals are compared, and the comparison result is stored. Therefore, unlike in analog signal control by a conventional apparatus in which a whole signal change pattern is not taken into consideration because a control operation is uniformly performed in accordance with one signal value at one timing, the control operation of the present invention has no such inconvenience. That is, if there is an abrupt signal change (e.g., 4T_L), on the basis of the statistical result of an error amount corresponding to this abrupt signal change, or, if there is a fine signal change (e.g., 2T_M), on the basis of the statistical result of an error amount corresponding to this fine signal change, a very appropriate waveform compensation amount C by which this error amount is canceled can be determined.

(Recording Waveform Generator: Three Methods of Recording Compensation)

Figure 10:
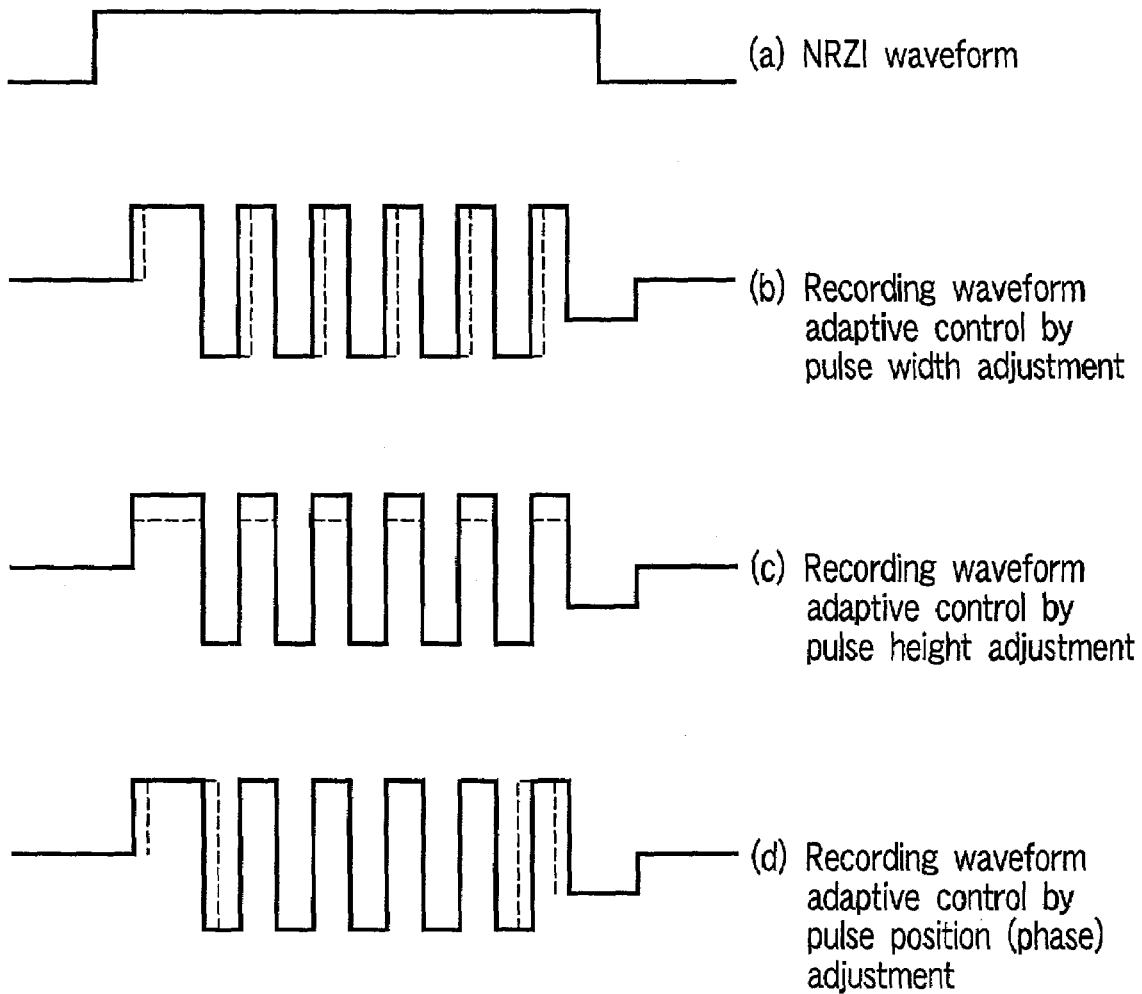
FIG. 10 is a timing chart showing a recording waveform compensation method of the first embodiment.

Three methods of recording compensation performed by the recording waveform generator 11 on the basis of the waveform compensation value C calculated by the parameter calculator 19 will be described in detail below with reference to the accompanying drawing. FIG. 10 is a timing chart showing recording waveform compensation methods.

The first method is recording waveform adaptive control by pulse width adjustment shown in (b) of FIG. 10. The widths of a first pulse, multi pulse, and last pulse are adjusted in accordance with waveform compensation values C. An nT mark is recorded using its mark length and the space lengths before and after the mark. For example, recording of a waveform pattern (sequence) having a 2T space, 3T mark, and 4T space will be explained. The width of a first pulse is adjusted in accordance with waveform compensation values C from the 2T_L, 3T_M, and 4T_T memories. If the cumulative sums in these 2T_L, 3T_M, and 4T_T memories are positive (negative), the first pulse width is decreased (increased). The adjustment amount depends upon the absolute value of a value obtained by dividing the cumulative sum of each memory by the modulus. Recording of a waveform pattern (sequence) having a 4T space, 5T mark, and 6T space will be explained as another example. The first pulse width is adjusted by a waveform compensation value C from the 4T_L memory, the first pulse width, multi pulse width, and last pulse width are adjusted by a waveform compensation value C from the 5T_M memory, and the last pulse width is adjusted by a waveform compensation value C from the 5T_T memory. If the cumulative sum in the 4T_L memory is positive (negative), the first pulse width is decreased (increased). If the cumulative sum in the 5T_M memory is positive (negative), the first pulse width, multi pulse width, and last pulse width are decreased (increased). If the cumulative sum in the 5T_T memory is positive (negative), the last pulse width is decreased (increased). This similarly applies to other waveform patterns (sequences).

The second method is recording waveform adaptive control by pulse height adjustment shown in (c) of FIG. 10. The heights of a first pulse, multi pulse, and last pulse are adjusted in accordance with waveform compensation values C. An nT mark is recorded using its mark length and the space lengths before and after the mark. For example, recording of a waveform pattern (sequence) having a 2T space, 3T mark, and 4T space will be explained. The first pulse height is adjusted in accordance with waveform compensation values C from the 2T_L, 3T_M, and 4T_T memories. If the cumulative sums in these 2T_L, 3T_M, and 4T_T memories are positive (negative), the first pulse height is decreased (increased). Recording of a waveform pattern (sequence) having a 4T space, 5T mark, and 6T space will be explained as another example. The first pulse height is adjusted by a waveform compensation value C from the 4T_L memory, the first pulse height, multi pulse height, and last pulse height are adjusted by a waveform compensation value C from the 5T_M memory, and the last pulse height is adjusted by a waveform compensation value C from the 5T_T memory. If the cumulative sum in the 4T L memory is positive (negative), the first pulse height is decreased (increased). If the cumulative sum in the 5T_M memory is positive (negative), the first pulse height, multi pulse height, and last pulse height are decreased (increased). If the cumulative sum in the 5T_T memory is positive (negative), the last pulse height is decreased (increased). This similarly applies to other waveform patterns (sequences).

The third method is recording waveform adaptive control by pulse position (phase) adjustment shown in (d) of FIG. 10. The positions (phases) of a first pulse, multi pulse, and last pulse are adjusted in accordance with waveform compensation values C. An nT mark is recorded using the space lengths before and after the mark. For example, recording of a waveform pattern (sequence) having a 2T space, 3T mark, and 4T space will be explained. The first pulse position is adjusted in accordance with waveform compensation values C from the 2T_L and 4T_T memories. If the cumulative sum in the 2T_L memory is positive (negative), the first pulse position is delayed (advanced). If the cumulative sum in the 4T_T memory is positive (negative), the first pulse position is delayed (advanced). Recording of a waveform pattern (sequence) having a 4T space, 5T mark, and 6T space will be explained as another example. The first pulse position is adjusted by a waveform compensation value C from the 4T_L memory, and the last pulse position is adjusted by a waveform compensation value C from the 5T_T memory. If the cumulative sum in the 4T_L memory is positive (negative), the first pulse position is delayed (advanced). If the cumulative sum in the 5T_T memory is positive (negative), the last pulse position is advanced (delayed). This similarly applies to other waveform patterns (sequences).

Note that these three methods can be combined with each other or can be used in combination with another method.

In accordance with the recording waveform pulses thus obtained, optimum waveform compensation corresponding to the characteristics of each individual optical disk is performed to reliably record data on the optical disk D.

In the first embodiment as described above, an ideal signal I is obtained on the basis of a detected reproduction signal S, and an error signal E indicating the difference between the reproduction signal S and the ideal signal I is obtained in accordance with the discriminated waveform pattern. The error signal E does not necessarily have one value; the error signal E can have two samples or three or more samples in accordance with the discriminated waveform pattern. The error signal E is obtained by comparing these samples and stored and accumulated in a predetermined storage area. By the use of this method of comparing data strings having a predetermined time width corresponding to the waveform pattern of the reproduction signal S, very appropriate waveform compensation is performed by taking account of even an error amount unique to the waveform pattern, unlike in a conventional apparatus by which control is performed using only one signal value at one certain timing. In this way, the first embodiment of the present invention can record data on an optical disk.

In the above-mentioned control method, in order to obtain a reproduction signal S which is generated by reproducing a recording signal recorded on an optical disk, the recording signal must be recorded beforehand. To record this recording signal, trial writing can be automatically performed immediately before the optical disk apparatus records data on the optical disk D. However, it is also possible to read out trial data written beforehand in a predetermined area of an optical disk.

Also, the recording compensation amount C described above can be determined by setting a trial writing time for determining the recording characteristics when data is to be recorded on one optical disk D. In this case, data is recorded on this optical disk D by using the determined compensation amount C to the end.

However, the present invention is not limited to this method. For example, reproduction is performed at the same time recording is performed, and the recording compensation amount C is determined in parallel with the recording and updated to an optimum recording compensation amount C in real time at any given timing. This method is also preferred. It is also possible to switch the aforementioned so-called trial writing mode and real-time mode. As described above, all various methods of practicing the waveform compensation process of the present invention within the range those skilled in the art can think of are, of course, included in the scope of the present invention.

<Optical Disk Apparatus of Second Embodiment>

The second embodiment is characterized in that an ideal signal is not generated from a Viterbi decoder 15 unlike in the first embodiment, but an ideal signal I is generated using recording data R to be recorded on an optical disk D. This second embodiment will be described in detail with reference to the accompanying drawing.

Figure 11:
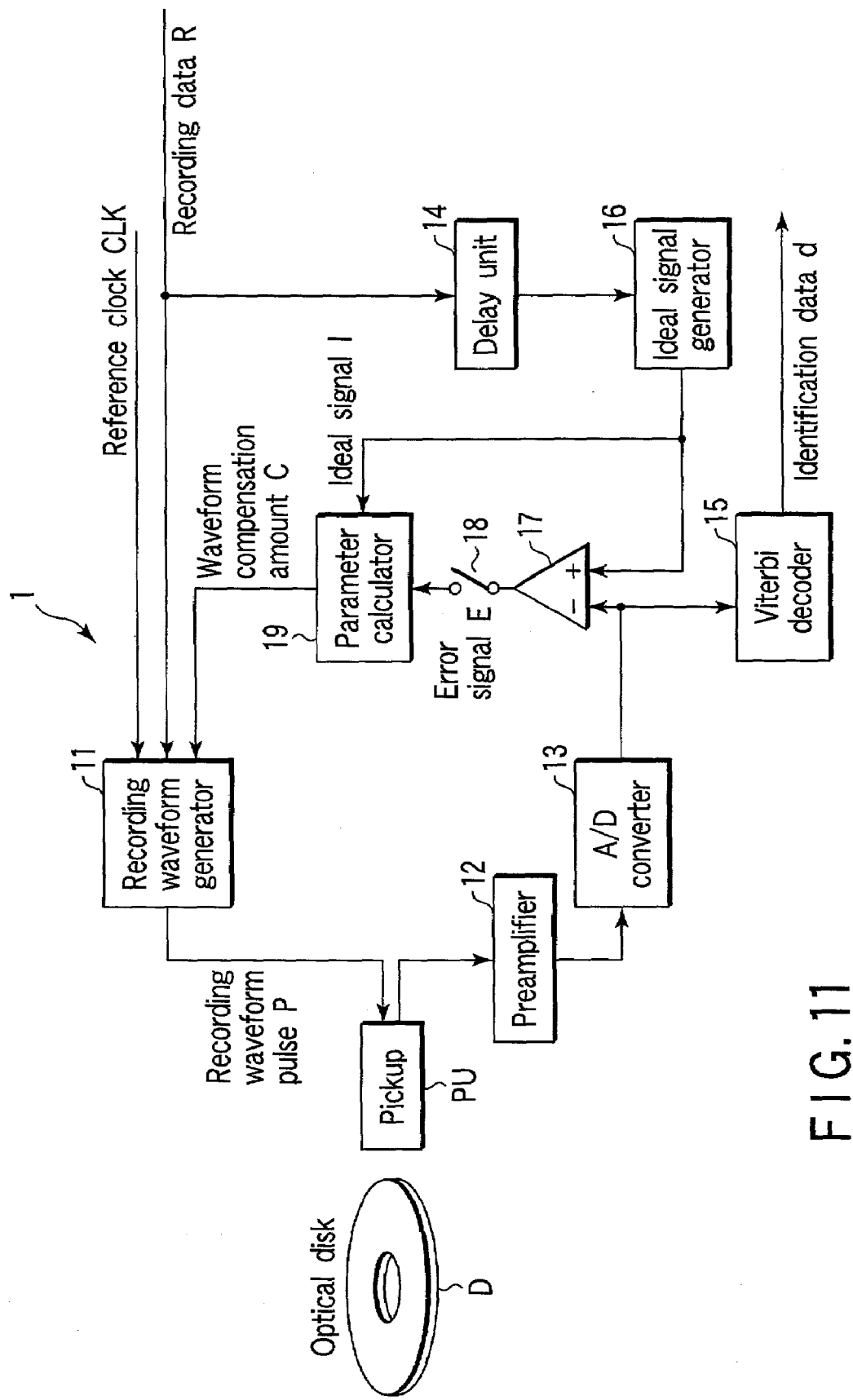
FIG. 11 is a block diagram showing the main part of the second embodiment of the optical disk apparatus according to the present invention.

FIG. 11 shows an example of the arrangement of the second embodiment of the present invention. An optical disk apparatus according to the second embodiment enables an appropriate waveform compensating function even when a digital method is used as an identification method, by using a data processing unit 1 as shown in FIG. 11. That is, this data processing unit 1 includes an A/D converter 13 for receiving a signal from a preamplifier 12, and a Viterbi decoder 15 using a PRML (Partial Response and Maximum Likelihood) method. An output from this Viterbi decoder 15 is not supplied to an ideal signal generator 16; the Viterbi decoder 15 supplies identification signal data d to a subsequent stage (not shown). The data processing unit 1 according to the second embodiment further includes a delay unit 14 for receiving recording data R, the ideal signal generator 16 for receiving the recording data R delayed by the delay unit 14, and a subtracter 17 which receives outputs from the delay unit 14 and the ideal signal generator 16. In addition, a parameter calculator 19 receives an error signal E as an output from the subtracter 17 and an ideal signal I from the ideal signal generator 16 to calculate a parameter, and outputs a waveform compensation amount C corresponding to the calculated parameter. A recording waveform generator 11 receives this waveform compensation amount C to generate a recording waveform, and supplies a recording waveform pulse P to a pickup PU.

As described earlier, the ideal signal generator 16 according to this second embodiment does not generate an ideal signal on the basis of an output from the Viterbi decoder 15, unlike the ideal signal generator 16 according to the first embodiment. That is, this ideal signal generator 16 of the second embodiment generates an ideal signal from a delay signal of the recording data R. Accordingly, it is no longer necessary to wait until the Viterbi decoder 15 finishes decoding a reproduction signal from the optical disk D, and there is no influence of identification error. This makes it possible to provide an optical disk apparatus capable of performing rapid and reliable recording waveform compensation.

<Optical Disk Apparatus of Third Embodiment>

The third embodiment is characterized in that an ideal signal is not generated whenever it is necessary, but reference data prepared beforehand is used as an ideal signal.

Figure 12:
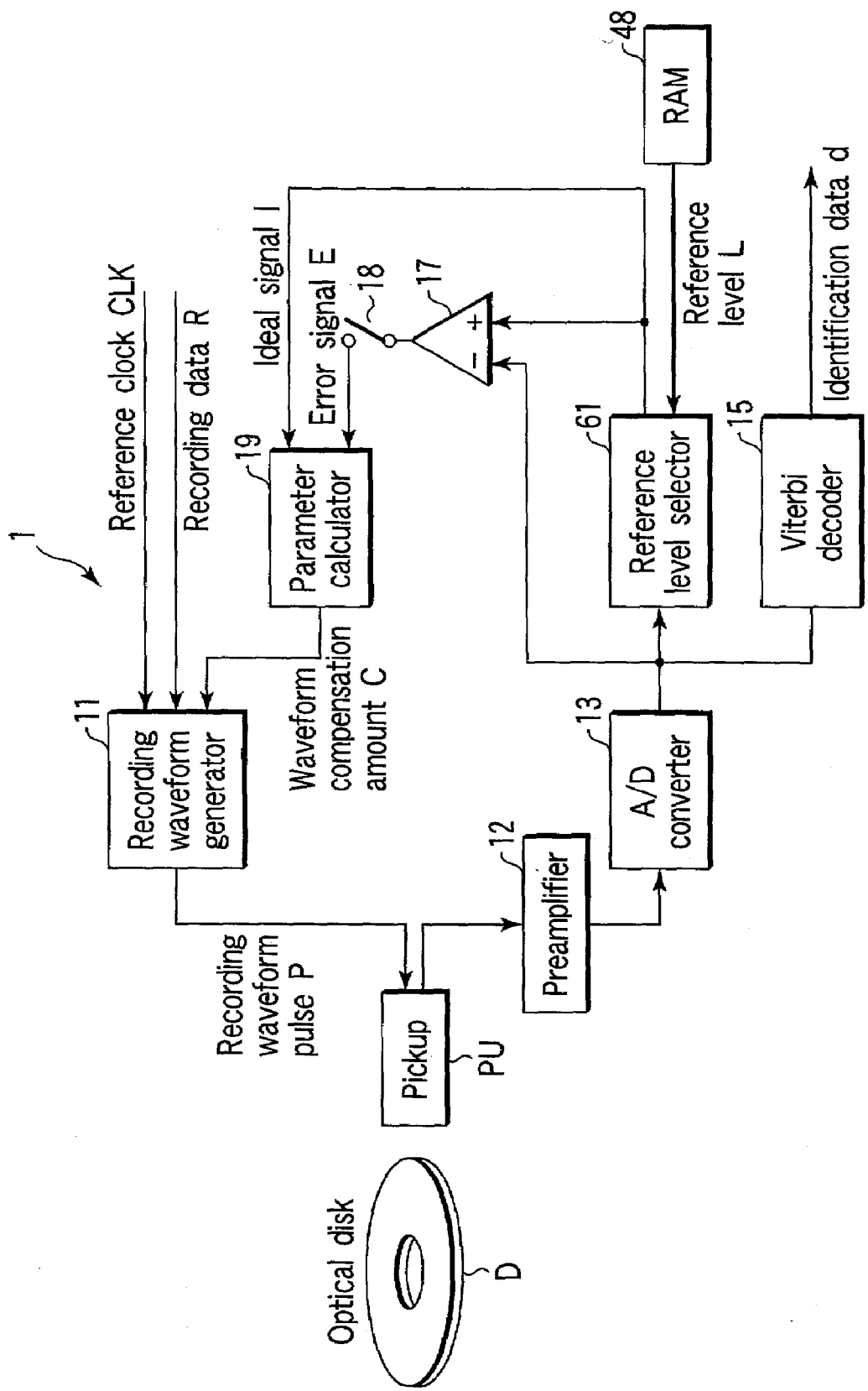
FIG. 12 is a block diagram showing the major component of the third embodiment of the optical disk apparatus according to the present invention.

FIG. 12 shows an example of the arrangement of the third embodiment of the present invention. An optical disk apparatus according to the third embodiment enables an appropriate waveform compensating function even when a digital method is used as an identification method, by using a data processing unit 1 as shown in FIG. 12. That is, this data processing unit 1 includes an A/D converter 13 for receiving a signal from a preamplifier 12, and a Viterbi decoder 15 using a PRML (Partial Response and Maximum Likelihood) method. An output from this Viterbi decoder 15 is not supplied to an ideal signal generator 16; the Viterbi decoder 15 supplies identification signal data d to a subsequent stage (not shown). The data processing unit 1 further includes a reference level selector 61 for receiving an output from the A/D converter 13 and a reference level L. An output from this reference level selector 61 is supplied as an ideal signal I to a subtracter 17 and a parameter calculator 19. The parameter calculator 19 receives an error signal E as an output from the subtracter 17 and the output from the reference level selector 61 to calculate a parameter, and outputs a waveform compensation amount C corresponding to the calculated parameter. A recording waveform generator 11 receives this waveform compensation amount C, a reference clock CLK, and recording data R to generate a recording waveform, and supplies a recording waveform pulse P to a pickup PU.

In the optical disk apparatus of the third embodiment, information recorded as marks and spaces on an optical disk is read out as a weak analog signal by the pickup PU. This weak analog signal is amplified to a sufficient level by the preamplifier. The amplified analog reproduction signal is converted into a digital reproduction signal by the A/D converter 13. This digital reproduction signal is divided into three signals: the first signal is supplied to the Viterbi decoder 15, the second signal is supplied to the reference level selector 61, and the third signal is supplied to the subtracter 17. The Viterbi decoder 15 decodes the signal into binary identification data in accordance with the Viterbi algorithm. This identification data is supplied to a subsequent circuit (not shown) and, if necessary, subjected to processing such as demodulation and error correction. After that, the data is transferred to a user.

The reference level selector 61 immediately selects a reference level, i.e., level 0, 1, 2, 3, 4, 5, or 6, from the digital reproduction signal. The waveform pattern (sequence) of the obtained level is an ideal signal I. The subtracter 17 subtracts a reproduction signal S (detection signal) from the ideal signal I to calculate an error signal E. This error signal E and the ideal signal I are supplied to the parameter calculator 19. The parameter calculator 19 calculates a waveform compensation amount of the recording waveform from these two signals. On the basis of the reference clock CLK, the recording data R, and the waveform compensation amount C, the recording waveform generator 11 generates a recording waveform pulse P. The pickup PU uses this recording waveform pulse P to record the recording data R on the optical disk.

FIG. 13 shows an example of the arrangement of the reference level selector 61. The reference level selector 61 comprises a plurality of comparators 71 for receiving reference level signals 0, 1, 2, 3, 4, 5, and 6, a plurality of absolute value calculators 72 for receiving outputs from these comparators 71, and a minimum value selector 73 for receiving outputs from these absolute value calculators 72. The reference level selector 61 also has a selector 74 which receives a signal indicating a minimum value input number as an output from the minimum value selector 73, and the reference level signals 0, 1, 2, 3, 4, 5, and 6. With this configuration, the reference level selector 61 outputs, to the subtracter 17 and the parameter calculator 19, a reference level by which the absolute value of the difference between the reproduction signal S and each reference level L is a minimum.

In this third embodiment, an ideal signal as the characteristic feature of the present invention is generated using externally given reference level signals, without using a detection signal from, e.g., the Viterbi decoder 15. This can further simplify the arrangement of the apparatus and can also increase the processing speed because it is unnecessary to wait for the completion of time-consuming Viterbi decoding.

<Optical Disk Apparatus of Fourth Embodiment>

The fourth embodiment is characterized in that in performing waveform compensation according to the present invention, the waveform patterns (sequences) of reproduction signals are classified by handling a leading space and mark as one pair and a trailing space and mark as another pair.

Figure 14:
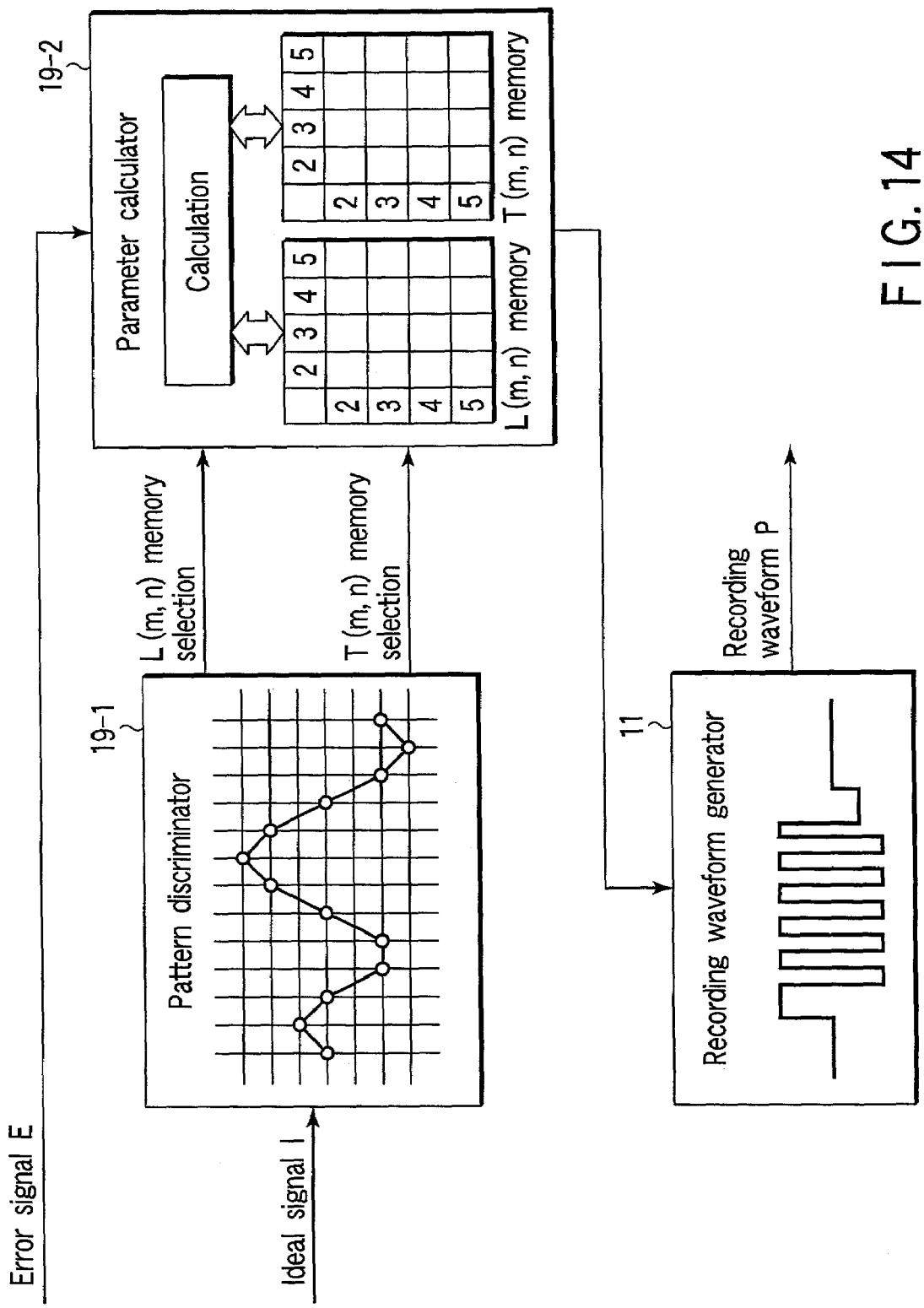
FIG. 14 is a block diagram showing the relationship between a parameter calculator and a recording waveform generator of the fourth embodiment.
Figure 15:
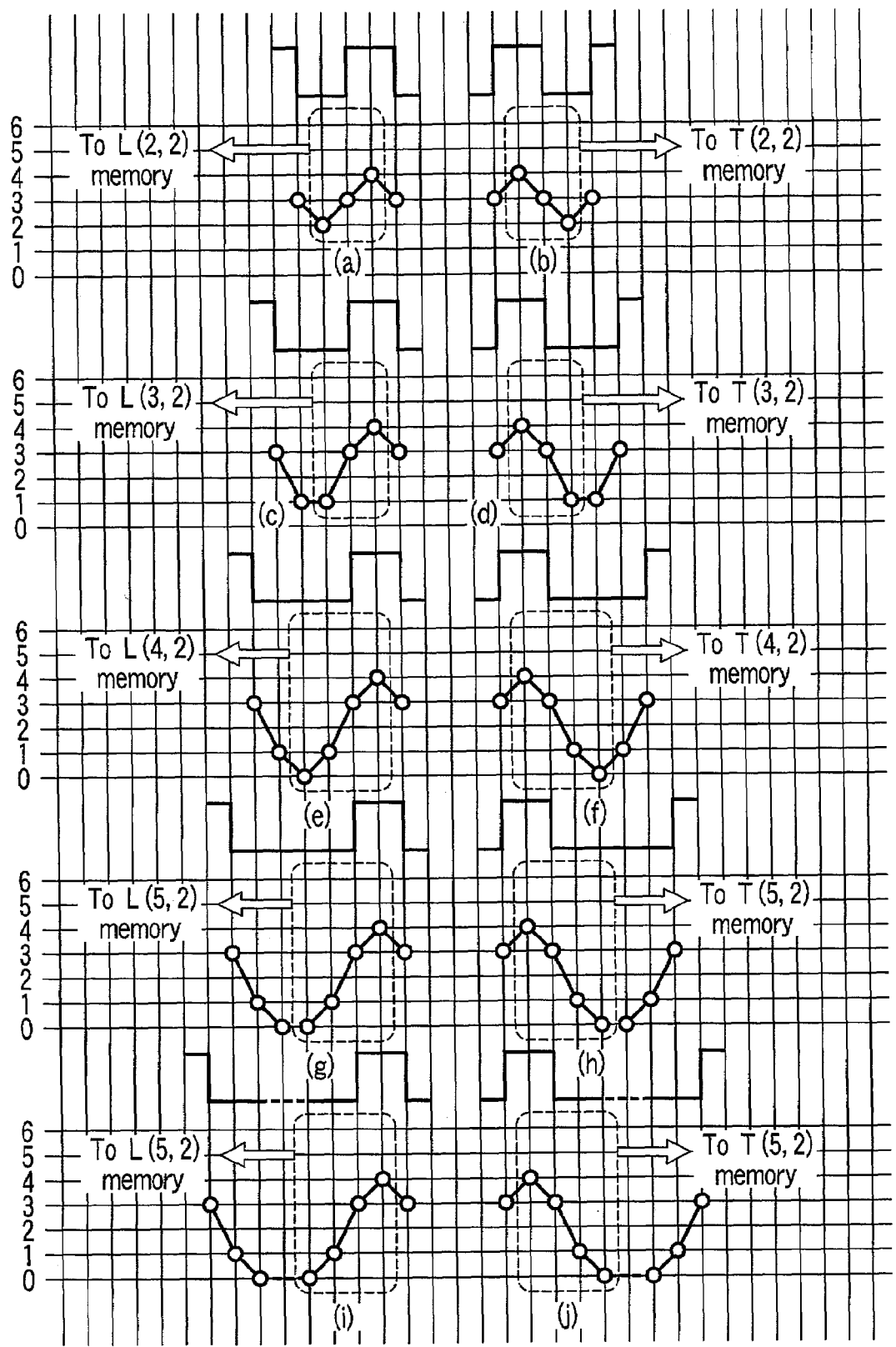
FIG. 15 is a graph showing the relationships (2T marks) between the data patterns and error signal cumulative addition memory positions.
Figure 16:
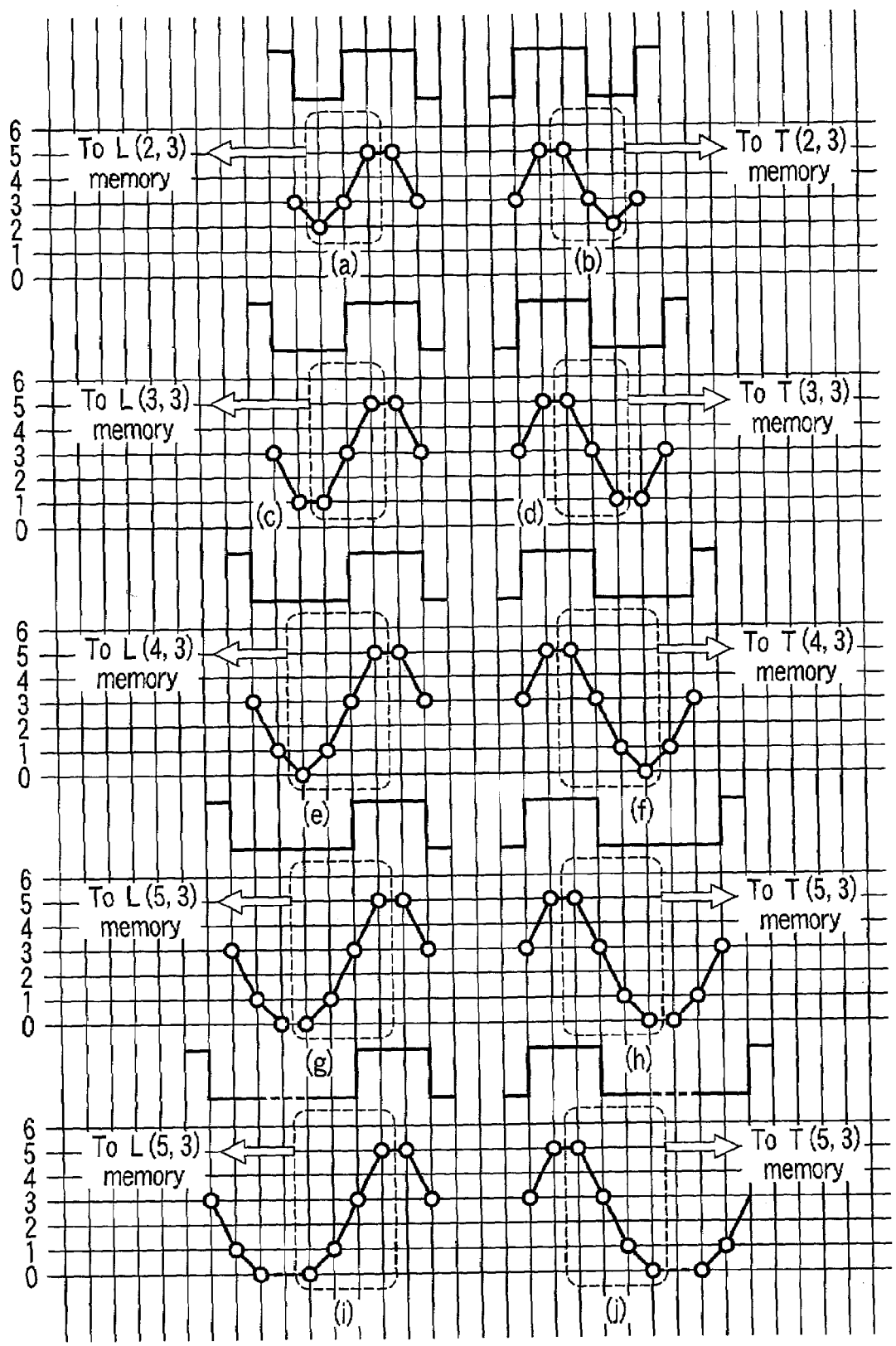
FIG. 16 is a graph showing the relationships (3T marks) between the data patterns and error signal cumulative addition memory positions.
Figure 17:
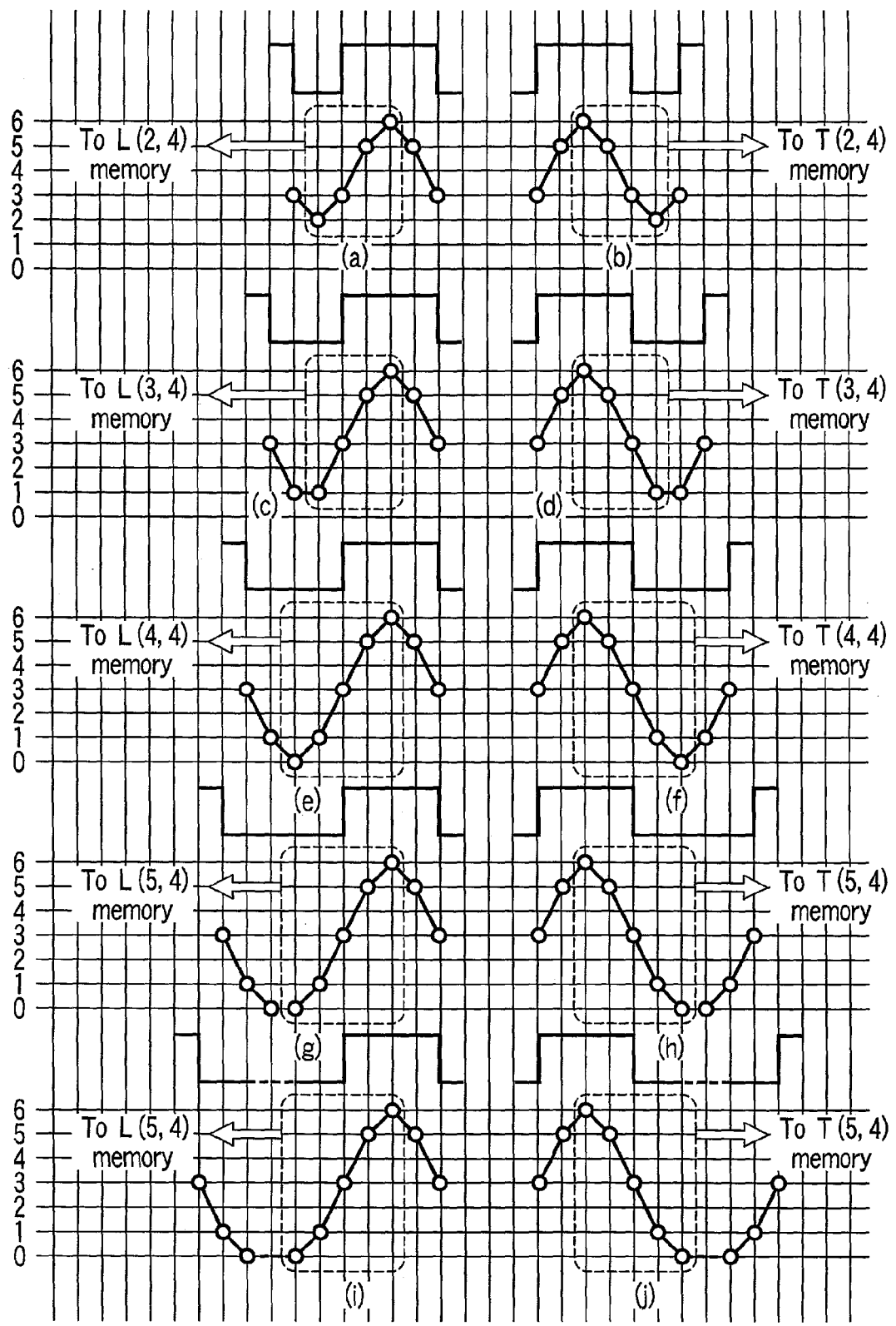
FIG. 17 is a graph showing the relationships (4T marks) between the data patterns and error signal cumulative addition memory positions.
Figure 18:
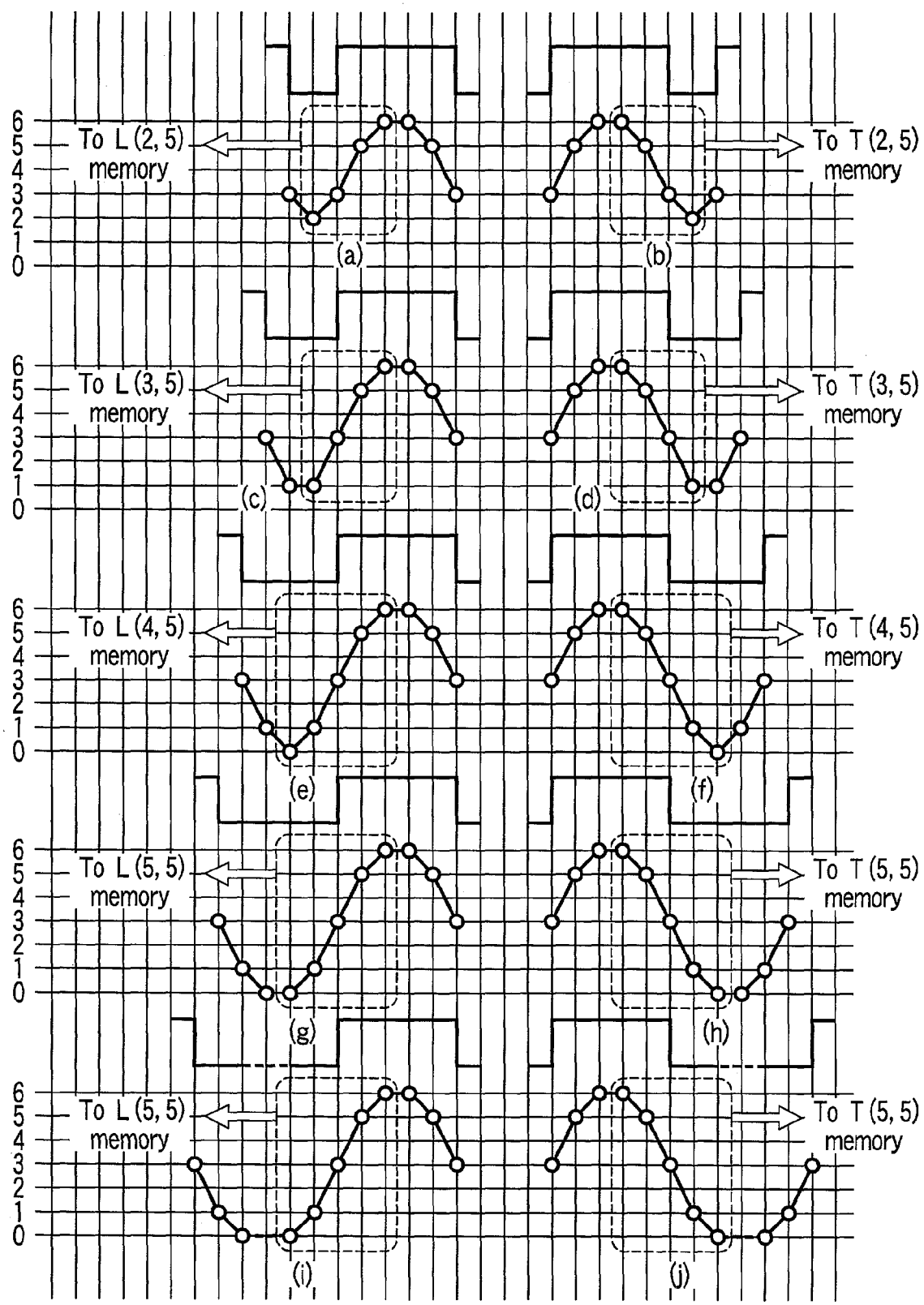
FIG. 18 is a graph showing the relationships (nT (n≧5) marks) between the data patterns and error signal cumulative addition memory positions.
Figure 19:
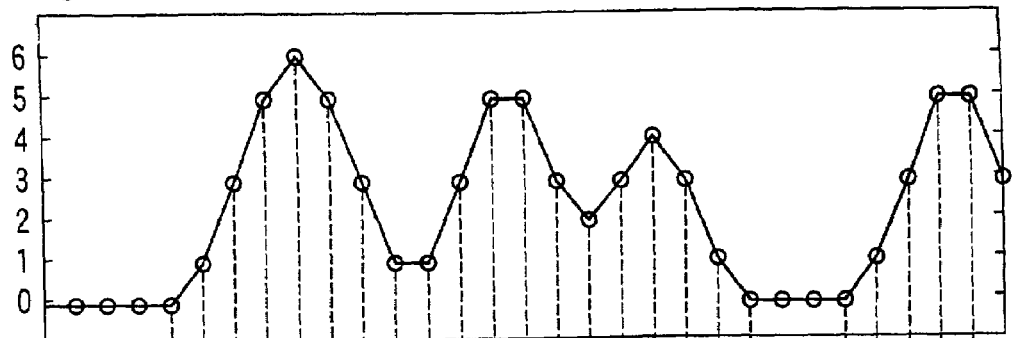
FIG. 19 is a view for explaining an example of the processing performed by the parameter calculator of the fourth embodiment.
Figure 19:
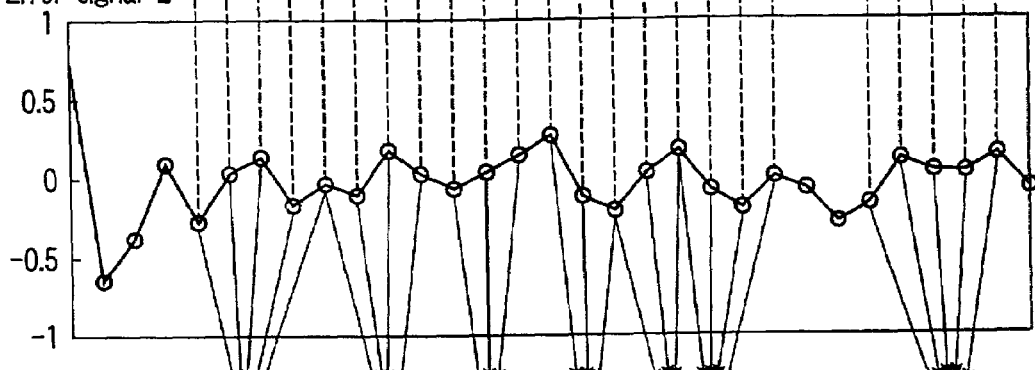
Figure 19:
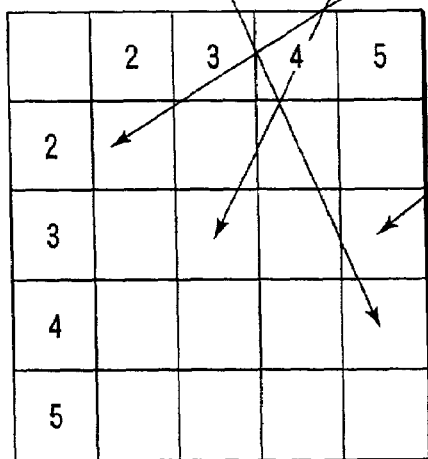
Figure 19:
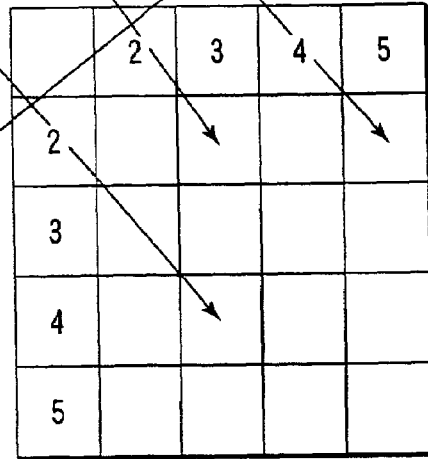

The fourth embodiment will be described in detail below with reference to the accompanying drawing. FIG. 14 is a block diagram showing the relationship between a parameter calculator and a recording waveform generator of the fourth embodiment. FIG. 15 is a graph showing the relationships (2T marks) between the data patterns and error signal cumulative addition memory positions. FIG. 16 is a graph showing 3T marks. FIG. 17 is a graph showing 4T marks. FIG. 18 is a graph showing nT (n>5) marks. FIG. 19 is a view for explaining an example of the processing by the parameter calculator of the fourth embodiment.

FIG. 14 is a block diagram showing a parameter calculator 19 and a recording waveform generator according to the fourth embodiment. Referring to FIG. 14, a leading space and mark are handled as a pair, and memories ((L(n,m) memories) are prepared for 16 combinations of four different leading spaces and marks 2T, 3T, 4T, and 5T (or higher). Likewise, a trailing space and mark are handled as a pair, and memories (T(n,m) memories) are prepared for 16 combinations of four different trailing spaces and marks 2T, 3T, 4T, and 5T (or higher). In accordance with this, a pattern discriminator 19-1 selects memories for L(m,n) and T(m,n). In accordance with these memory selecting signals, a parameter calculator 19-2 accumulates and stores corresponding error signals E into L(m,n) and T(m,n) memories.

FIGS. 15 to 18 illustrate the relationships between the waveform patterns and memories used. FIG. 15 shows the relationships between 2T marks and corresponding memories. For a pattern having a 2T space and 2T mark (a 2T mark and 2T space), error signals E corresponding to portions of a waveform pattern (sequence) at levels 2, 3, and 4 (4, 3, and 2) are cumulatively added to an L(2,2) (T(2,2)) memory. For a pattern having a 3T space and 2T mark (a 2T mark and 3T space), error signals E corresponding to portions of a waveform pattern (sequence) at levels 1, 3, and 4 (4, 3, and 1) are cumulatively added to an L(3,2) (T(3,2)) memory. For a pattern having a 4T space and 2T mark (a 2T mark and 4T space), error signals E corresponding to portions of a waveform pattern (sequence) at levels 0, 1, 3, and 4 (4, 3, 1, and 0) are cumulatively added to an L(4,2) (T(4,2)) memory. For a pattern having an nT (n≧5) space and 2T mark (a 2T mark and nT (n≧5) space), error signals E corresponding to portions of a waveform pattern (sequence) at levels 0, 1, 3, and 4 (4, 3, 1, and 0) are cumulatively added to an L(5,2) (T(5,2)) memory.

FIG. 16 shows the relationships between 3T marks and corresponding memories. For a pattern having a 2T space and 3T mark (a 3T mark and 2T space), error signals E corresponding to portions of a waveform pattern (sequence) at levels 2, 3, and 5 (5, 3, and 2) are cumulatively added to an L(2,3) (T(2,2)) memory. For a pattern having a 3T space and 3T mark (a 3T mark and 3T space), error signals E corresponding to portions of a waveform pattern (sequence) at levels 1, 3, and 5 (5, 3, and 1) are cumulatively added to an L(3,3) (T(3,3)) memory. For a pattern having a 4T space and 3T mark (a 3T mark and 4T space), error signals E corresponding to portions of a waveform pattern (sequence) at levels 0, 1, 3, and 5 (5, 3, 1, and 0) are cumulatively added to an L(4,3) (T(4,3)) memory. For a pattern having an nT (n≧5) space and 3T mark (a 3T mark and nT (n≧5) space), error signals E corresponding to portions of a waveform pattern (sequence) at levels 0, 1, 3, and 5 (5, 3, 1, and 0) are cumulatively added to an L(5,3) (T(5,3)) memory.

FIG. 17 shows the relationships between 4T marks and corresponding memories. For a pattern having a 2T space and 4T mark (a 4T mark and 2T space), error signals E corresponding to portions of a waveform pattern (sequence) at levels 2, 3, 5, and 6 (6, 5, 3, and 2) are cumulatively added to an L(2,4) (T(2,4)) memory. For a pattern having a 3T space and 4T mark (a 4T mark and 3T space), error signals E corresponding to portions of a waveform pattern (sequence) at levels 1, 3, 5, and 6 (6, 5, 3, and 1) are cumulatively added to an L(3,4) (T(3,4)) memory. For a pattern having a 4T space and 4T mark (a 4T mark and 4T space), error signals E corresponding to portions of a waveform pattern (sequence) at levels 0, 1, 3, 5, and 6 (6, 5, 3, 1, and 0) are cumulatively added to an L(4,4) (T(4,4)) memory. For a pattern having an nT (n≧5) space and 4T mark (a 4T mark and nT (n≧5) space), error signals E corresponding to portions of a waveform pattern (sequence) at levels 0, 1, 3, 5, and 6 (6, 5, 3, 1, and 0) are cumulatively added to an L(5,4) (T(5,4)) memory.

FIG. 18 shows the relationships between nT (n≧5) marks and corresponding memories. For a pattern having a 2T space and nT mark (an nT mark and 2T space), error signals E corresponding to portions of a waveform pattern (sequence) at levels 2, 3, 5, and 6 (6, 5, 3, and 2) are cumulatively added to an L(2,5) (T(2,5)) memory. For a pattern having a 3T space and nT mark (an nT mark and 3T space), error signals E corresponding to portions of a waveform pattern (sequence) at levels 1, 3, 5, and 6 (6, 5, 3, and 1) are cumulatively added to an L(3,5) (T(3,5)) memory. For a pattern having a 4T space and nT mark (an nT mark and 4T space), error signals E corresponding to portions of a waveform pattern (sequence) at levels 0, 1, 3, 5, and 6 (6, 5, 3, 1, and 0) are cumulatively added to an L(4,5) (T(4,5)) memory. For a pattern having an mT (m≧5) space and nT mark (an nT mark and mT (n≧5) space), error signals E corresponding to portions of a waveform pattern (sequence) at levels 0, 1, 3, 5, and 6 (6, 5, 3, 1, and 0) are cumulatively added to an L(5,5) (T(5,5)) memory.

Furthermore, in accordance with the relationships between the waveform patterns and memories depicted in the drawing, moduli are also counted in addition to the cumulative sums of the error signals E into the L(m,n) and T(m,n) (m, n=2, 3, 4, and 5) memories. When a predetermined period has elapsed, the cumulative sums stored in the L(m,n) and T(m,n) (m, n=2, 3, 4, and 5) memories are divided by the moduli. A waveform compensation value C is calculated from the quotients.

FIG. 19 illustrates, in more detail, this relationship between the reproduction signal S, the waveform pattern of the ideal signal I, the error signal E, and the memories. That is, the ideal signal I is generated in accordance with the detected reproduction signal S, and the error signal E which is the difference between the ideal signal I and the reproduction signal S is cumulatively added to a predetermined memory area in accordance with the waveform pattern of the ideal signal I. More specifically, since the waveform pattern of the first ideal signal I is L(4,5), the first five sample data are cumulatively added to the L(4,5) memory. The next four sample data are cumulatively added to the T(4,3) memory. In this manner, data are cumulatively added to predetermined memories in accordance with waveform patterns. Consequently, an error amount unique to a waveform pattern can be faithfully reflected on a waveform compensation amount C.

The fourth embodiment performs recording compensation as follows in accordance with the waveform compensation amount C calculated by division based on the cumulative sums which are stored in the individual memories in accordance with the above waveform patterns.

Three types of methods shown in FIG. 10 can be used as this recording compensation method. The first method is recording waveform adaptive control by pulse width adjustment shown in (b) of FIG. 10. The widths of a first pulse, multi pulse, and last pulse are adjusted in accordance with waveform compensation values C. An nT mark is recorded using its mark length and the space lengths before and after the mark. For example, recording of a waveform pattern (sequence) having a 2T space, 3T mark, and 4T space will be explained.

The first pulse width is adjusted in accordance with waveform compensation values C from the L(2,3) and T(4,3) memories. If the cumulative sums in these L(2,3) and T(4,3) memories are positive (negative), the first pulse width is decreased (increased). The adjustment amount depends upon the absolute value of a value obtained by dividing the cumulative sum of each memory by the modulus. Recording of a waveform pattern (sequence) having a 4T space, 5T mark, and 6T space will be explained as another example. The first pulse width is adjusted by a waveform compensation value C from the L(4,5) memory, and the last pulse width is adjusted by a waveform compensation value C from the T(5,5) memory. If the cumulative sum in the L(4,5) memory is positive (negative), the first pulse width is decreased (increased). If the cumulative sum in the T(5,5) memory is positive (negative), the last pulse width is decreased (increased). This similarly applies to other waveform patterns (sequences).

The second method is recording waveform adaptive control by pulse height adjustment shown in (c) of FIG. 10. The heights of a first pulse, multi pulse, and last pulse are adjusted in accordance with waveform compensation values C. An nT mark is recorded using its mark length and the space lengths before and after the mark. For example, recording of a waveform pattern (sequence) having a 2T space, 3T mark, and 4T space will be explained. The first pulse height is adjusted in accordance with waveform compensation values C from the L(2,3) and T(4,3) memories. If the cumulative sums in these L(2,3) and T(4,3) memories are positive (negative), the first pulse height is decreased (increased). Recording of a waveform pattern (sequence) having a 4T space, 5T mark, and 6T space will be explained as another example. The first pulse height is adjusted by a waveform compensation value C from the L(4,5) memory, and the last pulse height is adjusted by a waveform compensation value C from the T(5,5) memory. If the cumulative sum in the L(4,5) memory is positive (negative), the first pulse height is decreased (increased). If the cumulative sum in the T(5,5) memory is positive (negative), the last pulse height is decreased (increased). This similarly applies to other waveform patterns (sequences).

The third method is recording waveform adaptive control by pulse position (phase) adjustment shown in (d) of FIG. 10. The positions (phases) of a first pulse and last pulse are adjusted in accordance with waveform compensation values C. An nT mark is recorded using the space lengths before and after the mark. For example, recording of a waveform pattern (sequence) having a 2T space, 3T mark, and 4T space will be explained. The first pulse position is adjusted in accordance with waveform compensation values C from the L(2,3) and T(4,3) memories. If the cumulative sum in the L(2,3) memory is positive (negative), the first pulse position is delayed (advanced). If the cumulative sum in the T(4,3) memory is positive (negative), the first pulse position is delayed (advanced). Recording of a waveform pattern (sequence) having a 4T space, 5T mark, and 6T space will be explained as another example.

The first pulse position is adjusted by a waveform compensation value C from the L(4,5) memory, and the last pulse position is adjusted by a waveform compensation value C from the T(5,5) memory. If the cumulative sum in the L(4,5) memory is positive (negative), the first pulse position is delayed (advanced). If the cumulative sum in the T(5,5) memory is positive (negative), the last pulse position is advanced (delayed). This similarly applies to other waveform patterns (sequences).

Note that these three methods can also be combined with each other.

In the fourth embodiment as described in detail above, the waveform patterns (sequences) of reproduction signals are classified by handling a leading space and mark as one pair and a trailing space and mark as another pair. By the use of this method, it is possible to statistically obtain the error amounts of more various waveform patterns than in the previous embodiments. Consequently, a very appropriate waveform compensation amount can be obtained. This makes it possible to provide an optical disk apparatus which records data by performing recording waveform compensation matching the characteristics of each individual optical disk.

By the various embodiments described above, those skilled in the art can implement the present invention. However, various modifications of these embodiments are readily evident to those skilled in the art, so it is possible to apply the disclosed principle in a broad sense to various embodiments without any inventive capability. Thus, the present invention covers a wide range consistent with the disclosed principle and novel features and is not, of course, restricted to the above-mentioned embodiments.

For example, the above embodiments are explained by using the PR(1,2,2,1) characteristic, but the present invention is applicable to some other PR characteristic. Also, the embodiments are explained by using the RLL(1,7) code, but the present invention is applicable to another modulation code. Furthermore, the range of right of the present invention extends to a recording medium on which recording data is recorded by the above-mentioned methods, and to the optical disk recording/producing apparatus, shown in FIG. 2, which reproduces recording data recorded on this recording medium.

The optical disk apparatus according to the present invention as has been explained in detail above generates a data string having a predetermined time width corresponding to the waveform pattern of a reproduction signal detected from an optical disk, and also generates an ideal signal containing a data string having a predetermined time width corresponding to the waveform pattern. An error amount E is obtained by comparing the data string of the reproduction signal and the data string of the ideal signal. On the basis of this error amount E, a waveform compensation amount C is determined. The recording waveform of given recording data R is compensated by this waveform compensation amount C. After that, the recording data R is recorded on an optical disk.

As described above, a detection signal and an ideal signal are compared using not values at one certain timing but data strings which are a plurality of data having a predetermined time width. This allows an accurate detection of the error amount of a waveform pattern. Consequently, optimum recording waveform compensation can be performed on the basis of the statistical error amount of each waveform pattern.

What is claimed is:

1. An optical disk apparatus which records data on an optical disk, comprising:
    rotating means for rotating the disk at a predetermined rotating speed;
    reproduction signal generating means for irradiating the optical disk rotated by the rotating means with a laser beam, and generating a reproduction signal containing a data string having a predetermined time width corresponding to a waveform pattern of a reflected wave of the laser beam;
    ideal signal generating means for decoding, by a partial response maximum likelihood (PRML) method, the data string output from the reproduction signal generating means to extract identification data and generating, based on the identification data, an ideal signal containing a data string having the predetermined time width, which corresponds to the data string contained in the reproduction signal generated by the reproduction signal generating means;
    waveform pattern discriminating means for comparing the data string contained in the reproduction signal generated by the reproduction signal generating means with the data string contained in the ideal signal generated by the ideal signal generating means, and discriminating a leading space length, a leading mark length, a trailing space length and a trailing mark length of the waveform pattern of the data string output from the reproduction signal generating means;
    waveform compensation amount determining means for calculating an error amount parameter corresponding to the leading space length, the leading mark length, the trailing space length and the trailing mark length of the waveform pattern discriminated by the waveform pattern discriminating means, and determining a waveform compensation amount on the basis of the error amount parameter;
    recording waveform generating means for performing a predetermined process on a recording data externally supplied, and generating a recording waveform pulse on the basis of the waveform compensation amount determined by the waveform compensation amount determining means; and
    recording means for generating a laser beam in accordance with the recording waveform pulse generated by the recording waveform generating means, and irradiating a storage area of the optical disk with this laser beam to record the recording data.

2. An apparatus according to claim 1, wherein the ideal signal generating means generates the ideal signal on the basis of a recording data externally supplied.

3. An apparatus according to claim 1, wherein the ideal signal generating means generates the ideal signal on the basis of a reference level data prepared beforehand.

4. An optical disk recording medium wherein predetermined data is recorded by the recording waveform generated on the basis of the waveform compensation amount determined by the waveform compensation amount determining means of an optical disk apparatus according to any one of claims 1, 2, or 3.

5. An optical disk recording method which records data on an optical disk, comprising:
    the rotation step of rotating the disk at a predetermined rotating speed;
    the reproduction signal generation step of irradiating the optical disk rotated in the rotation step with a laser beam, and generating a reproduction signal containing a data string having a predetermined time width corresponding to a waveform pattern of a reflected wave of the laser beam;
    the ideal signal generation step of decoding, by a partial response maximum likelihood (PRML) method, the data string output in the reproduction signal generation step to extract identification data and generating, based on the identification data, an ideal signal containing a data string having the predetermined time width, which corresponds to the data string contained in the reproduction signal generated in the reproduction signal generation step;
    the waveform pattern discrimination step of comparing the data string contained in the reproduction signal generated in the reproduction signal generation step with the data string contained in the ideal signal generated in the ideal signal generation step, and discriminating a leading space length, a leading mark length, a trailing space length and a leading mark length of the waveform pattern of the data string output from the reproduction signal generation step;
    the waveform compensation amount determination step of calculating an error amount parameter corresponding to the leading space length, the leading mark length, the trailing space length and the leading mark length of the waveform pattern discriminated in the waveform pattern discrimination step, and determining a waveform compensation amount on the basis of the error amount parameter;
    the recording waveform generation step of performing a predetermined processing on a recording data externally supplied, and generating a recording waveform pulse on the basis of the waveform compensation amount determined in the waveform compensation amount determination step;
    the recording step of generating a laser beam in accordance with the recording waveform pulse generated in the recording waveform generation step, and irradiating a storage area of the optical disk with this laser beam to record the recording data.

6. A method according to claim 5, wherein the ideal signal generation step comprises generating the ideal signal on the basis of a recording data externally supplied.

7. A method according to claim 5, wherein the ideal signal generation step comprises generating the ideal signal on the basis of a reference level data prepared beforehand.

* * * * *